US011938737B2

(12) United States Patent
Horiuchi et al.

(10) Patent No.: US 11,938,737 B2
(45) Date of Patent: Mar. 26, 2024

(54) SUPPLY UNIT AND LIQUID DISCHARGING APPARATUS

(71) Applicant: SEIKO EPSON CORPORATION, Tokyo (JP)

(72) Inventors: Toshihiro Horiuchi, Shiojiri (JP); Shunsuke Tamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 17/664,796

(22) Filed: May 24, 2022

(65) Prior Publication Data

US 2022/0379622 A1 Dec. 1, 2022

(30) Foreign Application Priority Data

May 26, 2021 (JP) ................................ 2021-088215
Jun. 18, 2021 (JP) ................................ 2021-101395

(51) Int. Cl.
*B41J 2/175* (2006.01)
*B41J 2/15* (2006.01)

(52) U.S. Cl.
CPC ............. *B41J 2/17523* (2013.01); *B41J 2/15* (2013.01); *B41J 2/17513* (2013.01); *B41J 2/17556* (2013.01)

(58) Field of Classification Search
CPC ......................... B41J 2/17523; B41J 2/17513; B41J 2/17556; B41J 2002/17573; B41J 2/17553; B41J 2/17566; B41J 2/17509; B41J 2/15; B41J 2/1752; B41J 2/1753; B41J 2/175
See application file for complete search history.

(56) References Cited

U.S. PATENT DOCUMENTS

| | | | | |
|---|---|---|---|---|
| 2009/0051745 | A1* | 2/2009 | Watanabe ............ | B41J 2/17566 347/86 |
| 2015/0375515 | A1 | 12/2015 | Seki et al. | |
| 2017/0341395 | A1* | 11/2017 | Toya .................... | B41J 2/17513 |
| 2018/0093483 | A1* | 4/2018 | Tomoguchi .......... | B41J 2/17566 |

FOREIGN PATENT DOCUMENTS

| | | |
|---|---|---|
| EP | 3412463 | 12/2018 |
| JP | 2020-175674 | 10/2020 |
| JP | 2016-010888 | 1/2021 |

* cited by examiner

*Primary Examiner* — Kristal Feggins
(74) *Attorney, Agent, or Firm* — WORKMAN NYDEGGER

(57) ABSTRACT

A supply unit in which a liquid container including a coupling portion being detachably mounted includes: a liquid introduction unit coupled to the coupling portion of the liquid container; an urging member that urges the liquid container in an uncoupling direction which is a direction opposite to a coupling direction, the coupling direction being a direction in which the liquid container is coupled to the liquid introduction unit; and an engagement lever having an engaging portion that engages with the liquid container when the liquid container is coupled to the liquid introduction unit, the engagement lever includes an operating portion operated by a user and a pressing portion configured to press the liquid container and is configured to release the engagement of the engaging portion with the liquid container when the operating portion is operated and to press the liquid container in the uncoupling direction by the pressing portion.

8 Claims, 29 Drawing Sheets

SUPPLY UNIT AND LIQUID DISCHARGING APPARATUS

The present application is based on, and claims priority from JP Application Serial Number 2021-088215, filed May 26, 2021 and JP Application Serial Number 2021-101395, filed Jun. 18, 2021, the disclosures of which are hereby incorporated by reference herein in their entirety.

BACKGROUND

1. Technical Field

The present disclosure relates to a supply unit and a liquid discharging apparatus.

2. Related Art

As disclosed in JP-A-2016-10888, there has heretofore been known a liquid discharging apparatus including a liquid container and discharging a liquid contained in the liquid container.

A tube insertion path into which an ink receiving tube of the liquid discharging apparatus is inserted is formed in one side surface of the liquid container described in JP-A-2016-10888, and a sealing member made of an elastic body is provided in the tube insertion path. When the liquid container is attached to the liquid discharging apparatus, the ink receiving tube of the liquid discharging apparatus is coupled to the liquid container while coming into contact with the sealing member. The liquid discharging apparatus is also provided with an eject spring that presses the liquid container in a removal direction. The liquid container is moved in the removal direction by the eject spring when the liquid container is changed from a state of being locked to the liquid discharging apparatus to a state of being released from the locked state.

However, in the configuration described in JP-A-2016-10888, the pressing force of the eject spring is used to remove the ink receiving tube from the tube insertion path and to push out the liquid container. Therefore, it is necessary to increase the pressing force of the eject spring. When attaching the liquid container to the liquid discharging apparatus, it is necessary to push the liquid container with a force larger than the pressing force of the eject spring. Therefore, there is a problem that when the pressing force of the eject spring is increased, the force required for attaching is also increased.

SUMMARY

A supply unit according to an aspect of the present disclosure in which a liquid container including a coupling portion having elasticity is detachably mounted, includes: a liquid introduction unit coupled to the coupling portion of the liquid container; an urging member that urges the liquid container in an uncoupling direction which is a direction opposite to a coupling direction, the coupling direction being a direction in which the liquid container is coupled to the liquid introduction unit; and an engagement lever having an engaging portion that engages with the liquid container when the liquid container is coupled to the liquid introduction unit, in which the engagement lever includes an operating portion operated by a user and a pressing portion configured to press the liquid container and is configured to release the engagement of the engaging portion with the liquid container when the operating portion is operated and to press the liquid container in the uncoupling direction by the pressing portion.

A liquid discharging apparatus according to an aspect of the present disclosure includes: the supply unit described above; and a liquid discharging head that discharges a liquid supplied from the supply unit to a medium.

DESCRIPTION OF EXEMPLARY EMBODIMENTS

First Embodiment

Figure 1:
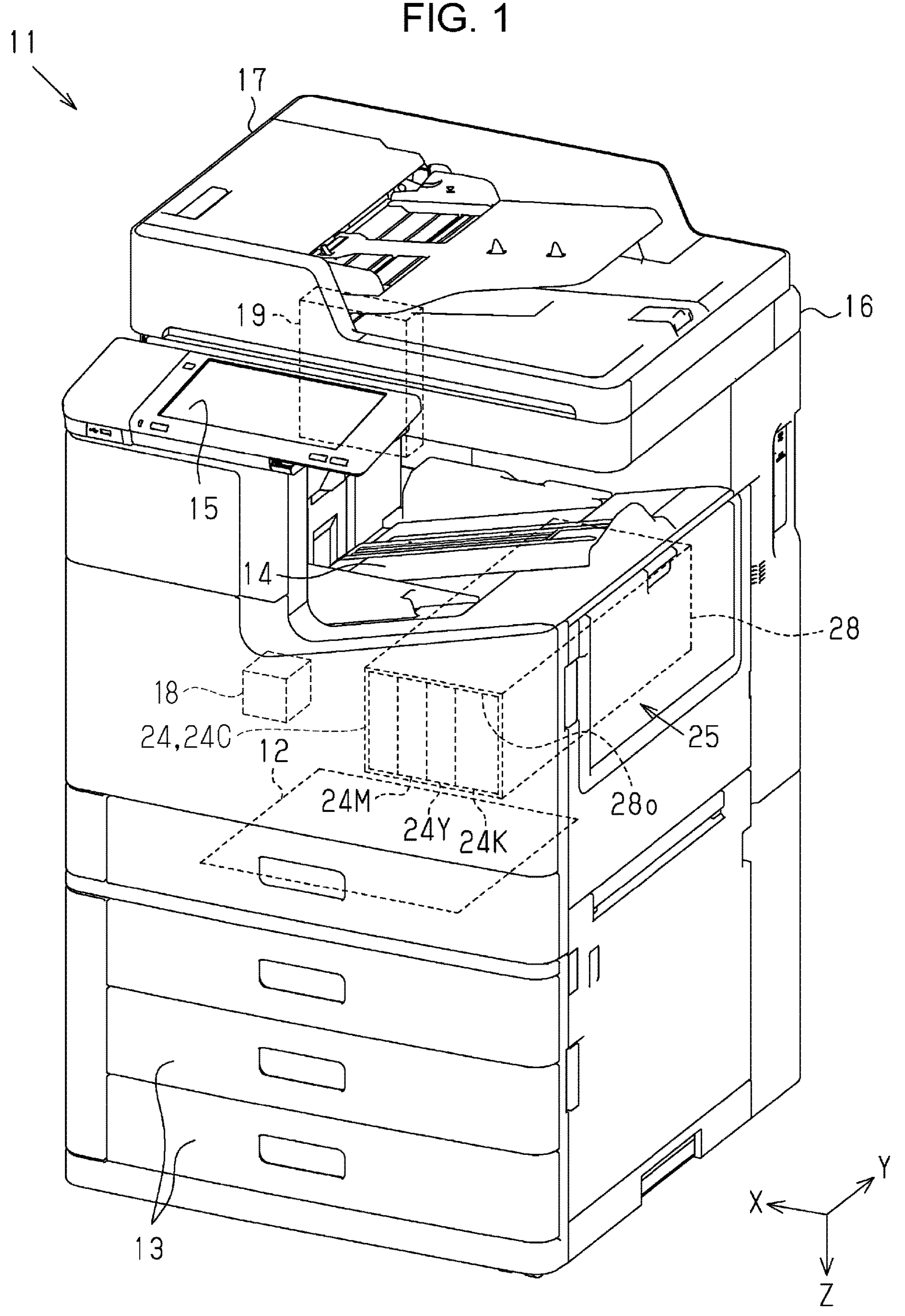
FIG. 1 is a perspective view of a liquid discharging apparatus.

With reference to the drawings, a supply unit 25 and a liquid discharging apparatus 11 according to a first embodiment will be described below. The liquid discharging apparatus 11 is, for example, an ink jet printer that performs printing by discharging ink as an example of a liquid onto a medium 12 such as paper.

In the drawings, assuming that the liquid discharging apparatus 11 is placed on a horizontal plane, a direction of gravitational force is represented by a Z-axis and directions along the horizontal plane are represented by an X-axis and a Y-axis. The X-axis, the Y-axis, and the Z-axis are orthogonal to each other. When a user faces the front of the liquid discharging apparatus 11, the Y-axis represents a depth direction of the liquid discharging apparatus 11. Among directions along the Y-axis, a direction from the front to the rear is a +Y direction and a direction opposite thereto is a −Y direction. The X-axis represents a width direction of the liquid discharging apparatus 11. Among directions along the X-axis, a leftward direction is a +X direction and a rightward direction is a −X direction when the user faces the front of the liquid discharging apparatus 11. Among directions along the Z-axis, a downward direction is a +Z direction and an upward direction is a −Z direction.

A. Overall Configuration of Liquid Discharging Apparatus

As illustrated in FIG. 1, the liquid discharging apparatus 11 may include one or more medium containers 13, a stacker 14, and an operation unit 15. Each of the medium containers 13 is, for example, a cassette capable of containing one or more media 12. The stacker 14 is arranged to receive the printed medium 12. The operation unit 15 is, for example, a touch panel for operating the liquid discharging apparatus 11. The touch panel may be arranged so as to face the front of the liquid discharging apparatus 11.

The liquid discharging apparatus 11 may include an image reader 16 that reads an image on a document and an automatic feeder 17 that feeds the document to the image reader 16. The image reader 16 and the automatic feeder 17 are arranged above the stacker 14, for example.

The liquid discharging apparatus 11 includes a controller 19 that controls various operations to be executed by the liquid discharging apparatus 11. The controller 19 may be configured as circuitry including 1) one or more processors that operate according to a computer program, 2) one or more dedicated hardware circuits, such as an ASIC, that execute at least some of various kinds of processing, or 3) a combination thereof. The processor includes a CPU and a memory such as a RAM and a ROM, and the memory stores a program code or a command configured to cause the CPU to execute processing. The memory, that is, a computer-readable medium includes any available medium accessible by a general-purpose or dedicated computer.

The liquid discharging apparatus 11 includes a supply unit 25. The supply unit 25 may include a mounting section 28 in which one or more liquid containers 24 are detachably mounted. The mounting section 28 may have a plurality of slots corresponding to the respective liquid containers 24. The mounting section 28 has an insertion opening 28*o* formed therein to insert the liquid containers 24. The insertion opening 28*o* opens toward the front of the liquid discharging apparatus 11, for example. The liquid discharging apparatus 11 may include a cover (not illustrated) that covers the insertion opening 280. The cover may be movable between a position to cover the insertion opening 28*o* and a position to open the insertion opening 280.

The insertion opening 28*o* is arranged so as to open in the front of the liquid discharging apparatus 11, that is, in the −Y direction, for example. In this case, the liquid container 24 is inserted in the +Y direction from the front of the liquid discharging apparatus 11, for example, through the insertion opening 280.

The plurality of liquid containers 24 (24C, 24M, 24Y, and 24K) may contain respective different types of liquids, for example, inks of different colors. For example, the liquid containers 24C, 24M, 24Y, and 24K contain cyan, magenta, yellow, and black inks, respectively. The plurality of liquid containers 24 may contain different amounts of liquids from each other. For example, the liquid container 24K containing the black ink may contain more liquid than the other liquid containers 24C, 24M, and 24Y. The liquid container 24K may be wider, that is, longer along the X-axis than the other liquid containers 24C, 24M, and 24Y.

The liquid discharging apparatus 11 includes a liquid discharging head 18 having a large number of nozzles (not illustrated) formed therein. The liquid discharging head 18 is configured to discharge the liquids supplied from the liquid containers 24 mounted in the supply unit 25 from the nozzles onto the medium 12.

B. Configuration of Liquid Container

Figure 2:
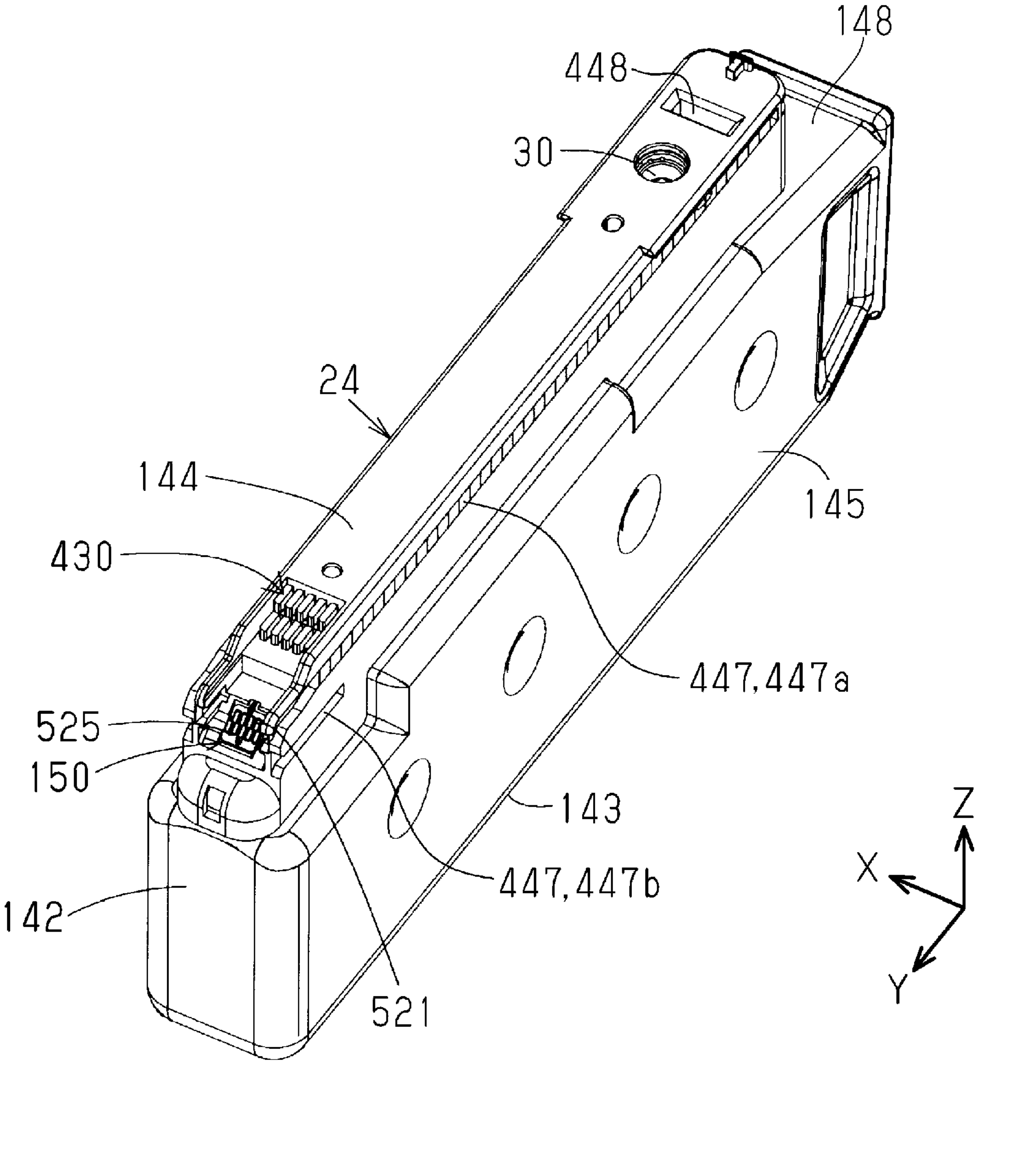
FIG. 2 is a perspective view of a liquid container.
Figure 3:
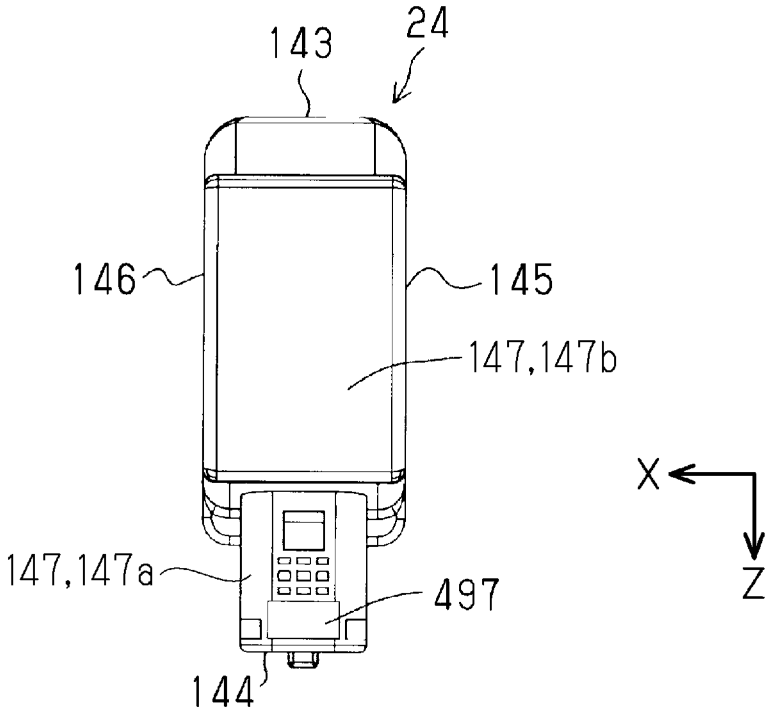
FIG. 3 is a rear view of the liquid container.

As illustrated in FIGS. 2 and 3, the liquid container 24 is, for example, a cartridge having a first end wall 142, an upper wall 143, a bottom wall 144, a first side wall 145, a second side wall 146, and a second end wall 147. When the liquid container 24 is mounted in the liquid discharging apparatus 11, the first end wall 142 is inserted first.

As illustrated in FIG. 2, the liquid container 24 may have an identification portion 430 on the bottom wall 144 for identifying the type of the liquid container 24. The identification portion 430 may be, for example, a plurality of protrusions arranged in the width direction.

The liquid container 24 may have a positioning hole 448 in the bottom wall 144. The positioning hole 448 may be a recess that opens in the bottom wall 144. The liquid container 24 may have a lead-out portion 30 that opens in the bottom wall 144. The liquid contained in the liquid container 24 flows out of the liquid container 24 through the lead-out portion 30.

The liquid container 24 may have a circuit board 150 in a portion with a corner cut off where the bottom wall 144 and the first end wall 142 intersect. The circuit board 150 may include a coupling terminal 521 and a storage medium 525. The storage medium 525 may store information about the liquid container 24, for example, information about the liquid contained in the liquid container 24.

The liquid container 24 may have two receivers 447 extending along respective the Y-axis on the first side wall 145 and the second side wall 146. In each of the first and second side walls 145 and 146, the receiver 447 may include a first receiver 447*a* and a second receiver 447*b* having different heights. The first receiver 447*a* may be a groove extending along the bottom wall 144. The second receiver 447*b* is located at a position higher than the first receiver 447*a*, that is, on the −Z side and is shorter along the Y-axis than the first receiver 447*a*. The second receiver 447*b* may be arranged near the circuit board 150.

As illustrated in FIG. 3, the liquid container 24 has an engaging recess 497 in the second end wall 147. The engaging recess 497 is a recess that opens in the second end wall 147 and is arranged at a position on the +Z side of the second end wall 147, that is, at a position close to the bottom wall 144, for example. The engaging recess 497 may be arranged in the center of the second end wall 147 in the width direction. The second end wall 147 has a step formed therein, and the end wall 147*b* on the −Z side is located on the −Y side with respect to the end wall 147*a* on the +Z side where the engaging recess 497 is arranged. A portion of the liquid container 24 located in the −Y direction with respect to the end wall 147*a* constitutes a protrusion 148.

C. Configuration of Mounting Section

Figure 4:
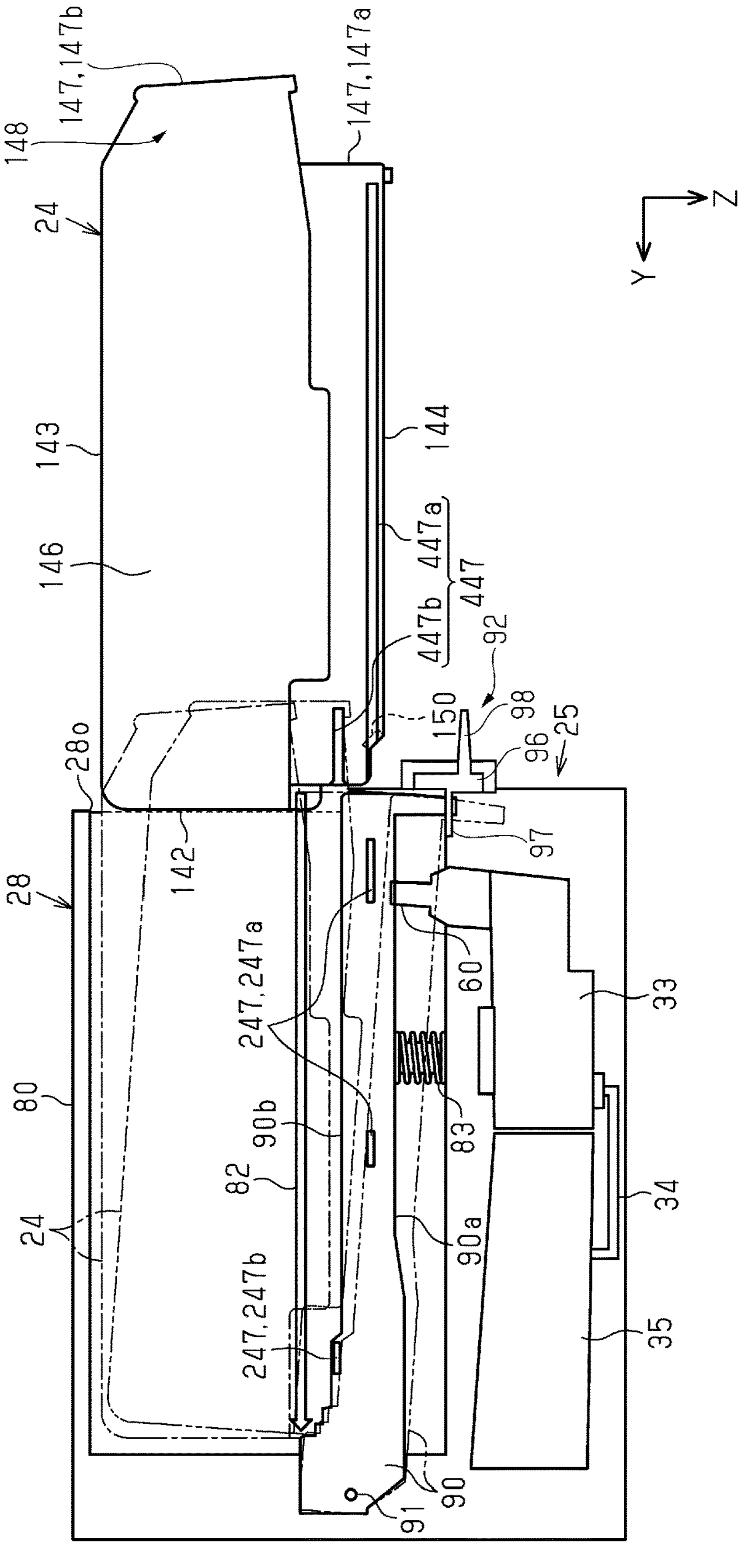
FIG. 4 is a view illustrating a schematic configuration of a supply unit.

As illustrated in FIG. 4, the mounting section 28 includes a box-shaped frame 80, a support member 90, a rotation shaft 91, and a liquid introduction unit 60. The support member 90, the rotation shaft 91, and the liquid introduction unit 60 are arranged in the frame 80. The liquid container 24 is inserted into the frame 80 through the insertion opening 28*o* and moves toward the back of the frame 80. The moving direction of the liquid container 24 in this event, that is, the insertion direction into the mounting section 28 is the +Y direction.

The support member 90 is a member that supports the liquid container 24 and extends along a linear guide path 82 that intersects both a vertical line along the Z-axis and the rotation shaft 91 along the X-axis. That is, the guide path 82 extends along the moving direction of the liquid container 24, that is, along the Y-axis. The support member 90 has a tip region where the starting point of the guide path 82 is located and a base end region where the terminal point of the guide path 82 is located. The base end region of the support member 90 and the rotation shaft 91 are arranged at the inner back of the frame 80, that is, at positions away from the insertion opening 28*o* in the +Y direction. The support member 90 may have a bottom plate 90*a* and two side ribs 90*b*. The two side ribs 90*b* are arranged at respective both ends of the bottom plate 90*a* in the width direction.

The support member 90 may have one or more guide portions 247 that guide the movement of the liquid container 24. The guide portion 247 may be, for example, a pair of guide rails arranged on the pair of side ribs 90*b* or may be a single guide rail arranged on the bottom plate 90*a*.

The guide portion 247 may include a first guide portion 247*a* and a second guide portion 247*b* arranged so as to engage with the first receiver 447*a* and the second receiver 447*b*, respectively. The first and second guide portions 247*a* and 247*b* may be, for example, protrusions extending in the longitudinal direction of the support member 90. The second guide portion 247*b* is located at a position higher than the first guide portion 247*a*, that is, on the −Z side and is shorter along the longitudinal direction than the first guide portion 247*a*. The second guide portion 247*b* may be arranged closer to the rotation shaft 91 than the first guide portion 247*a* may be. The first guide portion 247*a* may be arranged at a position corresponding to the liquid introduction unit 60 in the moving direction of the liquid container 24.

The rotation shaft 91 has an axis that intersects both the vertical straight line along the Z-axis and the guide path 82 along the Y-axis, and is arranged in the base end region of the support member 90. That is, the axis of the rotation shaft 91 extends along the X-axis. The support member 90 is configured to rotate around the rotation shaft 91 between a guide position to guide the liquid container 24 along the guide path 82 and a coupling position where the liquid container 24 is coupled to the liquid introduction unit 60. The coupling position is located in the +Z direction relative to the guide position. In FIG. 4, the support member 90 at the guide position is indicated by the solid line, and the liquid container 24 mounted in the mounting section 28 at the guide position is indicated by the dashed-dotted line. The support member 90 at the coupling position and the liquid container 24 at that position are indicated by the dashed-two dotted lines. The rotation shaft 91 corresponds to a second rotation shaft. The guide position corresponds to a first position, and the coupling position corresponds to a second position.

The liquid introduction unit 60 is a cylindrical member inserted into the lead-out portion 30 of the liquid container 24, and is arranged below the support member 90. When the support member 90 is arranged at the coupling position, the liquid introduction unit 60 is coupled to the liquid container 24. The liquid introduction unit 60 may be arranged in an inclined posture with respect to the guide path 82. More specifically, the liquid introduction unit 60 may be tilted so that its tip is located closer to the insertion opening 28*o* than its base end is. For example, the liquid introduction unit 60 may have its center line form an angle of 0° to 15° with the vertical line.

The mounting section 28 may include a first urging member 83 as an urging member that urges the support member 90 in the −Z direction from the coupling position toward the guide position. The first urging member 83 is, for example, a coil spring. In a state where the liquid container 24 is mounted in the mounting section 28, the first urging member 83 urges the liquid container 24 in the −Z direction via the support member 90. On the other hand, in a non-mounted state where the liquid container 24 is not inside the mounting section 28, the support member 90 is arranged at the guide position by being urged by the first urging member 83.

When the liquid container 24 is mounted in the mounting section 28 in the non-mounted state where the support member 90 is at the guide position, the user inserts the liquid container 24 in an appropriate direction from the insertion opening 28*o* and pushes the liquid container in the +Y direction. The liquid container 24 is guided in the +Y direction along the guide path 82 with the receiver 447 being engaged with the guide portion 247, and reaches a predetermined position on the support member 90 at the terminal point of the guide path 82. In this state, the protrusion 148 of the liquid container 24 protrudes from the insertion opening 28*o* toward the −Y side. Thereafter, as the user pushes the protrusion 148 in the +Z direction, the support member 90 is rotated around the rotation shaft 91 to the coupling position, and thus the lead-out portion 30 of the liquid container 24 is coupled to the liquid introduction unit 60. The +Z direction that is the direction from the guide position to the coupling position, that is, the direction in which the liquid container 24 is coupled to the liquid introduction unit 60 corresponds to a coupling direction, and a direction opposite thereto, that is, the −Z direction from the coupling position to the guide position corresponds to an uncoupling direction. That is, the first urging member 83 urges the support member 90 in the uncoupling direction.

The supply unit 25 may include a first storage section 33, a communicating path 34, and a second storage section 35 below the support member 90. The liquid introduction unit 60 protrudes upward from the first storage section 33. When the liquid introduction unit 60 is coupled to the liquid container 24, the liquid in the liquid container 24 is introduced into the first storage section 33 through the liquid introduction unit 60 and temporarily stored in the first storage section 33. The second storage section 35 is communicated with the first storage section 33 through the communicating path 34. The liquid in the first storage section 33 flows into the second storage section 35 through the communicating path 34. The supply unit 25 is configured to supply the liquid from the second storage section 35 to the liquid discharging head 18 (see FIG. 1).

Figure 5:
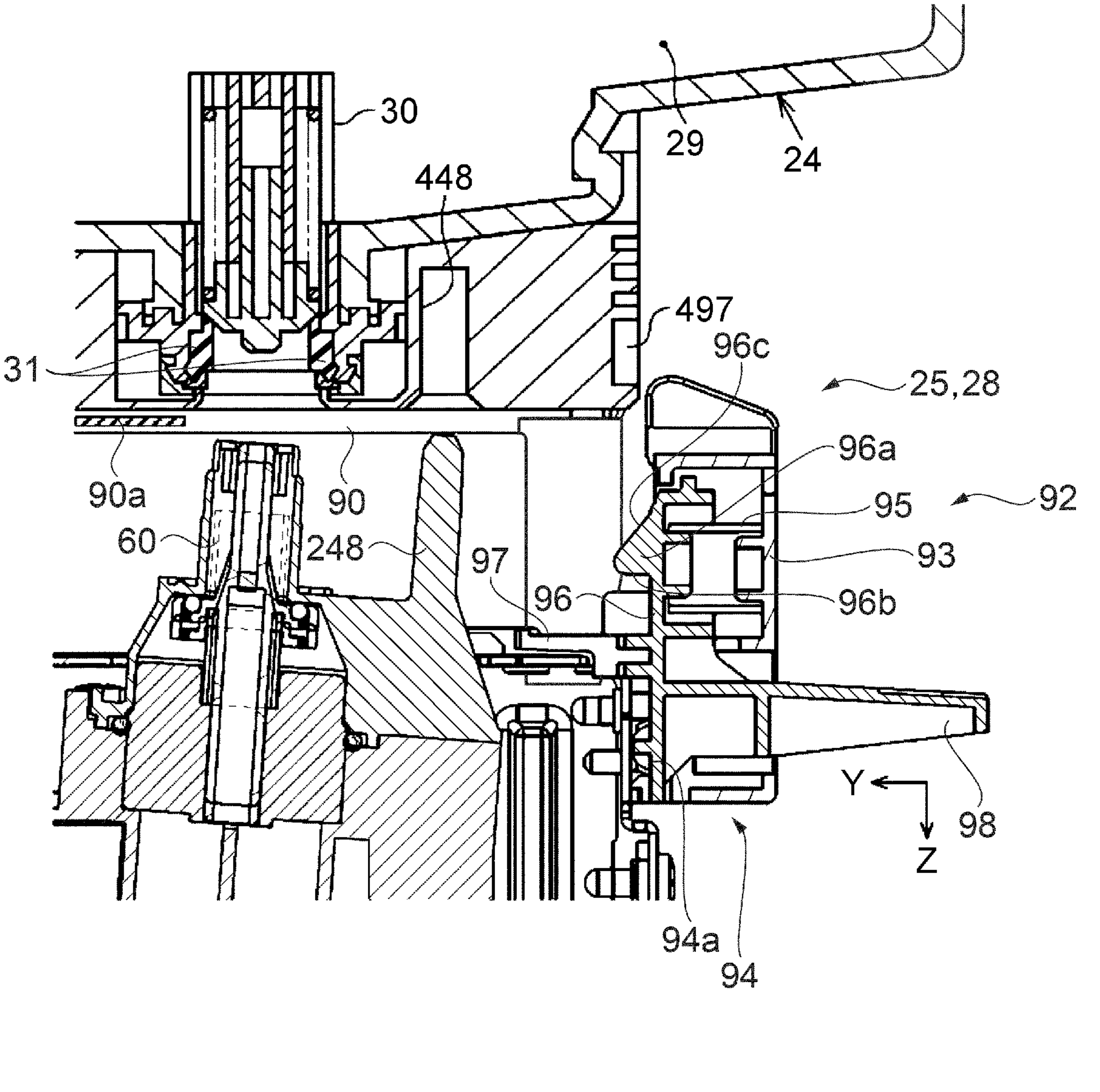
FIG. 5 is a sectional view for explaining the structure of the supply unit and the liquid container.

As illustrated in FIG. 5, the mounting section 28 may have a positioning protrusion 248 that protrudes upward near the liquid introduction unit 60. The liquid container 24 is positioned by engaging the positioning hole 448 with the positioning protrusion 248. The positioning protrusion 248 may be tilted at the same angle as the liquid introduction unit 60. The bottom plate 90*a* of the support member 90 is notched at a portion above the positioning protrusion 248 and the liquid introduction unit 60.

On the inner wall of the lead-out portion 30 of the liquid container 24, an annular coupling portion 31 is arranged, which is coupled to the liquid introduction unit 60. The coupling portion 31 is formed of an elastic member such as rubber, and adheres tightly to the outer surface of the liquid introduction unit 60 in a state where the liquid introduction unit 60 is inserted into the lead-out portion 30 of the liquid container 24, thus increasing the airtightness of the lead-out portion 30. To release the coupling between the liquid container 24 and the liquid introduction unit 60 by returning the support member 90 from the coupling position to the guide position, it is necessary to release the adhesion of the coupling portion 31. Therefore, a greater force is required as compared with a case of simply lifting the liquid container 24 and the support member 90.

Figure 6:
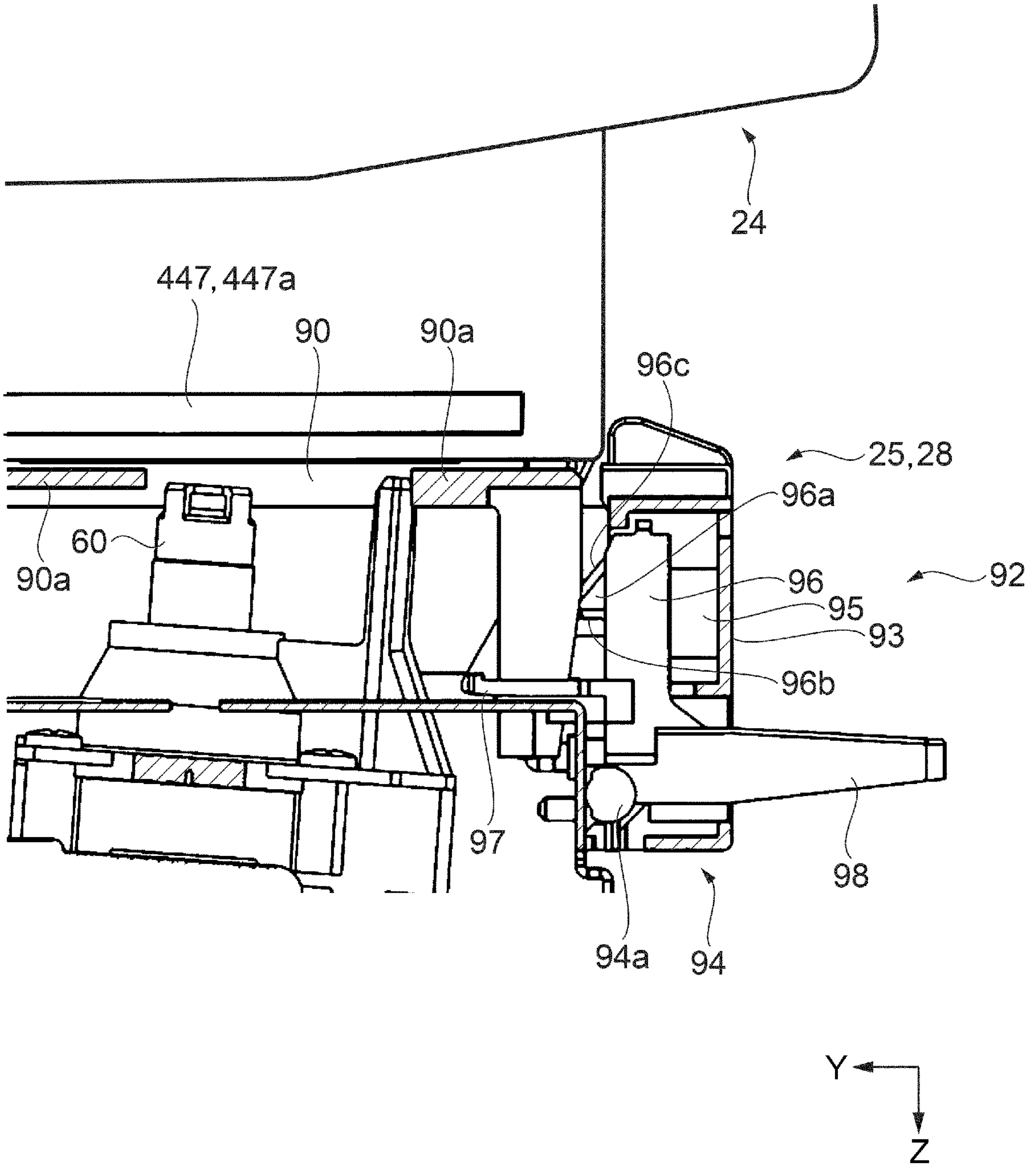
FIG. 6 is a sectional view of the supply unit when a support member is located at a guide position.

As illustrated in FIGS. 5 and 6, the mounting section 28 may include an engagement lever 92 arranged so as to face the tip region of the support member 90. The engagement lever 92, the positioning protrusion 248, and the liquid introduction unit 60 may be arranged in this order in the +Y direction. The engagement lever 92 may have a base portion 93 fixed to the frame 80 and a movable unit 94 rotatable with respect to the base portion 93. The movable unit 94 rotates with respect to the base portion 93 about a rotation shaft 94*a* extending along the X-axis. The rotation shaft 94*a* corresponds to a first rotation shaft.

The movable unit 94 has an engaging portion 96, a pressing portion 97, and an operating portion 98, which are integrally formed. The engaging portion 96 extends upward from the rotation shaft 94*a*, that is, in the −Z direction, and a protrusion 96*a* protruding toward the support member 90 is formed near the upper end thereof. The protrusion 96*a* includes a bottom surface 96*b* facing in the +Z direction and an inclined surface 96*c* facing in a direction in which the +Y direction and the −Z direction are combined. The engagement lever 92 is provided with a second urging member 95 that urges the engaging portion 96 in the +Y direction, that is, toward the support member 90, and the engaging portion 96 is urged by the second urging member 95 and maintains a posture substantially parallel to the vertical line. The second urging member 95 is, for example, a coil spring.

In the process of rotating the support member 90 from the guide position (see FIG. 6) to the coupling position (see FIG. 7), the liquid container 24 comes into contact with the inclined surface 96*c* of the protrusion 96*a*, and the engaging portion 96 is rotated so as to move the protrusion 96*a* in the −Y direction against the urging by the second urging member 95. Thereafter, as the support member 90 reaches the coupling position and the liquid container 24 is coupled to the liquid introduction unit 60, the protrusion 96*a* faces the engaging recess 497 of the liquid container 24 and enters into the engaging recess 497 by being urged by the second urging member 95. This engages the engaging portion 96 with the engaging recess 497 of the liquid container 24. In this state, the bottom surface 96*b* of the protrusion 96*a* prevents the support member 90 from returning to the guide position by being urged by the first urging member 83, and thus the liquid container 24 is fixed.

The pressing portion 97 is configured to be able to press the liquid container 24 in the −Z direction via the support member 90. The pressing portion 97 extends in the +Y direction and is arranged directly below the bottom plate 90*a* of the support member 90 when the support member 90 is at the coupling position.

The operating portion 98 extends in the −Y direction from the rotation shaft 94*a*. The engagement lever 92 is arranged in the mounting section 28 so that at least the operating portion 98 is located on the outside of the insertion opening 28*o*, that is, on the −Y side. The operating portion 98 is operated by the user to remove the mounted liquid container 24. When the operating portion 98 is pushed downward, that is, in the +Z direction, the movable unit 94 rotates clockwise in FIGS. 5 to 8, that is, in a direction against the urging force of the second urging member 95 about the rotation shaft 94*a*.

Figure 7:
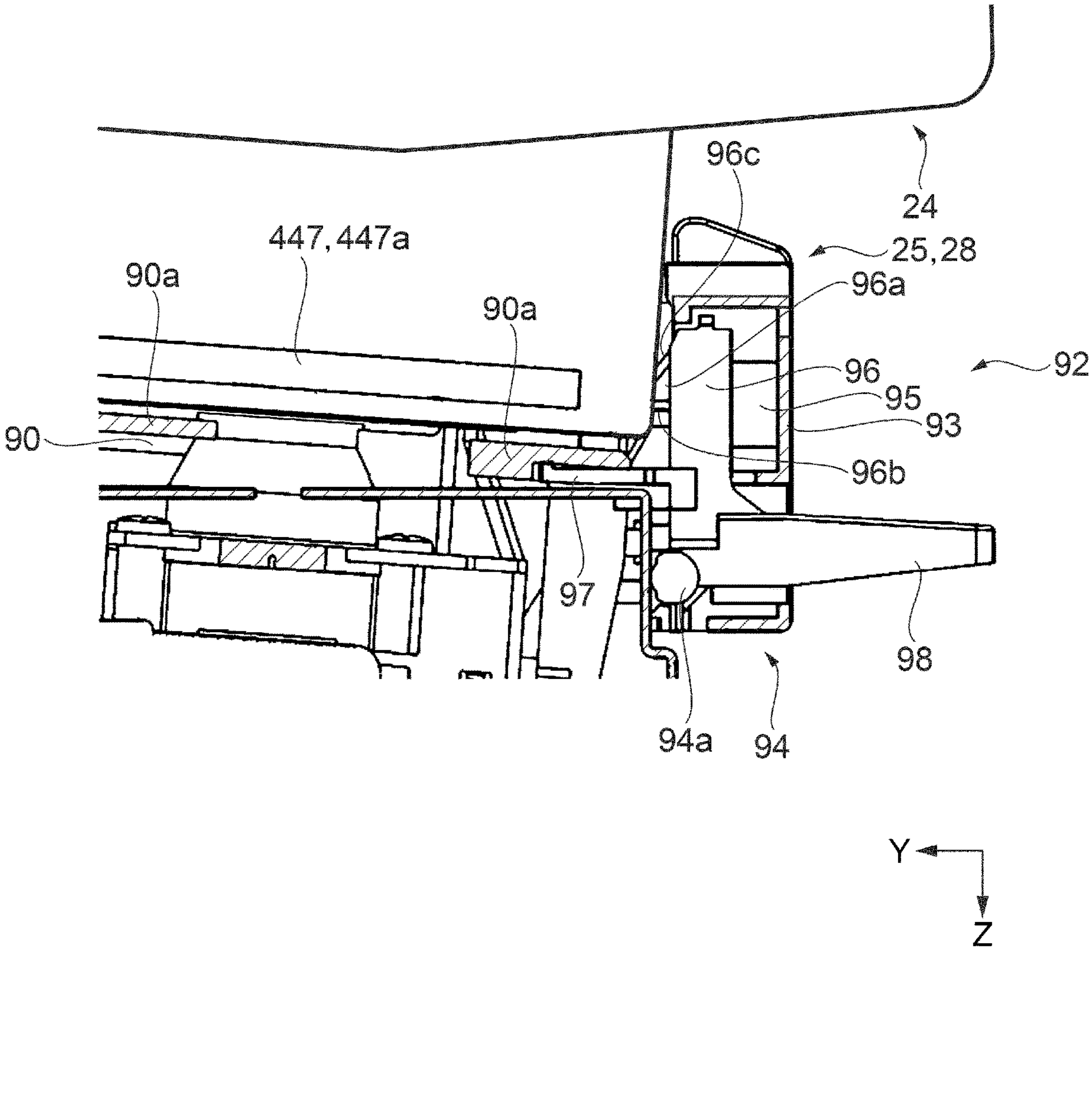
FIG. 7 is a sectional view of the supply unit when the support member is located at a coupling position.
Figure 8:
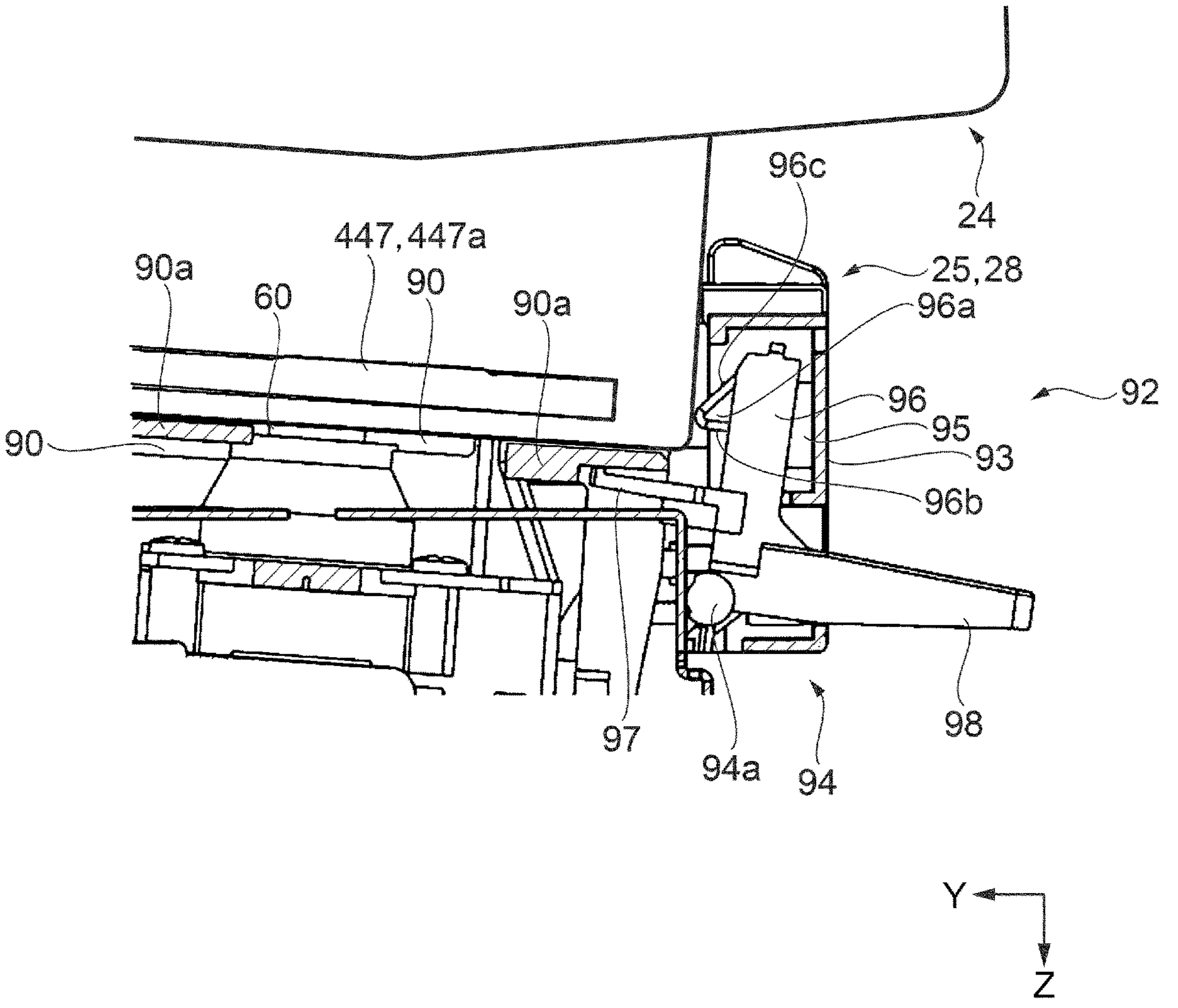
FIG. 8 is a sectional view of the supply unit immediately after an engagement lever is operated.

As illustrated in FIG. 7, when the operating portion 98 is pushed in and the movable unit 94 is rotated in a state where the support member 90 is at the coupling position, that is, the liquid container 24 is coupled to the liquid introduction unit 60, the protrusion 96*a* of the engaging portion 96 is disengaged from the engaging recess 497, and the engaging portion 96 is disengaged from the liquid container 24 as illustrated in FIG. 8. In conjunction with this operation, the pressing portion 97 comes into contact with the lower surface of the bottom plate 90*a* of the support member 90 and presses the support member 90 in the −Z direction. As a result, the support member 90 is slightly lifted and the adhesion between the coupling portion 31 of the liquid container 24 and the liquid introduction unit 60 is released. Thus, the coupling between the liquid container 24 and the liquid introduction unit 60 is released. Thereafter, the liquid container 24 and the support member 90 are further pushed up in the −Z direction by the urging force of the first urging member 83, and the support member 90 returns to the guide position. In this state, the user can easily remove the liquid container 24.

The distance between the rotation shaft 94*a* and the operating portion 98 may be longer than the distance between the rotation shaft 94*a* and the pressing portion 97. To be more specific, assuming that a position where the pressing portion 97 comes into contact with the bottom plate 90*a* when the operating portion 98 is pushed downward is a pressing position, the distance between the rotation shaft 94*a* and the tip of the operating portion 98 may be longer than the distance between the rotation shaft 94*a* and the pressing position of the pressing portion 97. Thus, it is possible to suppress the force by which the user pushes the operating portion 98 in order to push up the support member 90 by the pressing portion 97. However, when it is assumed that the user pushes down the operating portion 98 in a position inside the tip position thereof, the distance from the rotation shaft 94*a* to this position may be set longer than the distance between the rotation shaft 94*a* and the pressing position. The distance between the rotation shaft 91 of the support member 90 and the pressing position is longer than the distance from the rotation shaft 91 to the coupling position between the liquid introduction unit 60 and the liquid container 24. Therefore, the force required for the pressing portion 97 to push up the support member 90 can be suppressed.

D. Advantageous Effects of This Embodiment

As described above, according to this embodiment, when the operating portion 98 is operated, the engagement lever 92 disengages the engaging portion 96 from the liquid container 24 and the pressing portion 97 presses the liquid container 24 in the −Z direction. Therefore, it is possible to reduce the urging force of the first urging member 83 as compared with a configuration in which the liquid container 24 is detached depending only on the urging force of the first urging member 83. As a result, it is possible to reduce the force required to couple the liquid container 24 to the liquid introduction unit 60.

According to this embodiment, after the support member 90 is pressed in the −Z direction by the pressing portion 97 and the adhesion between the coupling portion 31 of the liquid container 24 and the liquid introduction unit 60 is released, the support member 90 is moved to the guide position by the urging force of the first urging member 83. In other words, the distance of movement of the liquid container 24 on the support member 90 in the −Z direction by the pressing force of the pressing portion 97 is set shorter than the distance of movement of the liquid container 24 in the −Z direction by the urging force of the first urging member 83. Therefore, less pushing of the operating portion 98 is required, making it possible to suppress the engagement lever 92 from increasing in size.

According to this embodiment, since the engagement lever 92 is arranged so that the operating portion 98 is located outside the insertion opening 28*o* of the mounting section 28, the operating portion 98 can be easily operated.

According to this embodiment, the liquid container 24 is supported by the support member 90 and is configured to receive the urging force of the first urging member 83 and the pressing force of the pressing portion 97 via the support member 90. Therefore, the liquid container 24 can be easily mounted in and removed from the mounting section 28.

According to this embodiment, since the support member 90 moves between the guide position and the coupling position by rotating around the rotation shaft 91, the liquid container 24 can be easily coupled and uncoupled.

According to this embodiment, since the liquid introduction unit 60 is arranged in the inclined posture with respect to the guide path 82, the liquid container 24 can be smoothly coupled in the process of rotating the support member 90.

E. Other Embodiments

The above embodiment can be changed and implemented as described below. The embodiment and the following modifications can be implemented in combination with each other within a technically consistent range.

The coupling direction and the uncoupling direction of the liquid container 24 do not have to be along the Z-axis, and may be along the horizontal direction, for example.

The pressing portion 97 of the engagement lever 92 may be configured not to come into contact with the bottom plate 90*a* of the support member 90 when the operating portion 98 is not pushed.

The first urging member 83 may be configured to directly urge the liquid container 24 in the −Z direction without the support member 90 interposed therebetween. Likewise, the pressing portion 97 may be configured to directly press the liquid container 24 in the −Z direction without the support member 90 interposed therebetween.

The liquid discharging apparatus 11 may be a liquid discharging apparatus that ejects or discharges a liquid other than ink. The state of the liquid discharged as a minute amount of liquid droplets from the liquid discharging apparatus includes a granular shape, a tear drop-like shape, or a thread-like shape with a tail. The liquid referred to here may be any material that can be discharged from the liquid discharging apparatus. For example, the liquid may be in a state when a substance is in the liquid phase, and may include fluids such as a high-viscosity or low-viscosity liquid, sol, gel water, other inorganic solvents, organic solvents, solutions, liquid resin, liquid metal, and metallic melt. The liquid includes not only a liquid as a state of the substance but also those obtained by dissolving, dispersing or mixing, in a solvent, particles of a functional material made of solid matter such as pigments and metal particles, and the like. Typical examples of the liquid include ink, liquid crystal, and the like as described in the above embodiment. Here, the ink includes general water-based ink and oil-based ink as well as various liquid compositions such as gel ink and hot melt ink. As a specific example of the liquid discharging apparatus, there is an apparatus that discharges a liquid containing a material such as an electrode material or a color material in a dispersed or dissolved form, which is used for manufacturing of a liquid crystal display, an electroluminescence display, a surface-emitting display, and a color filter, or the like. The liquid discharging apparatus may be an apparatus that discharges a bioorganic substance used for producing a biochip, an apparatus used as a precision pipette to discharge a liquid as a specimen, a printing apparatus, a micro dispenser, or the like. The liquid discharging apparatus may be an apparatus that discharges lubricating oil to a precision machine such as a watch or a camera at a protrusion point, or may be an apparatus that discharges a transparent resin liquid such as ultraviolet curable resin onto a substrate to form a micro hemispherical lens, an optical lens or the like used for an optical communication element and the like. The liquid discharging apparatus may be an apparatus that discharges an etching liquid such as an acidic or alkaline etching liquid to etch a substrate or the like.

Second Embodiment

With reference to the drawings, a liquid ejecting apparatus of a second embodiment will be described below.

A liquid ejecting apparatus 111 of this embodiment is an ink jet printer that performs recording by ejecting ink as an example of a liquid onto a medium S such as paper transported along a Y-axis intersecting a Z-axis along a liquid ejecting direction.

Figure 9:
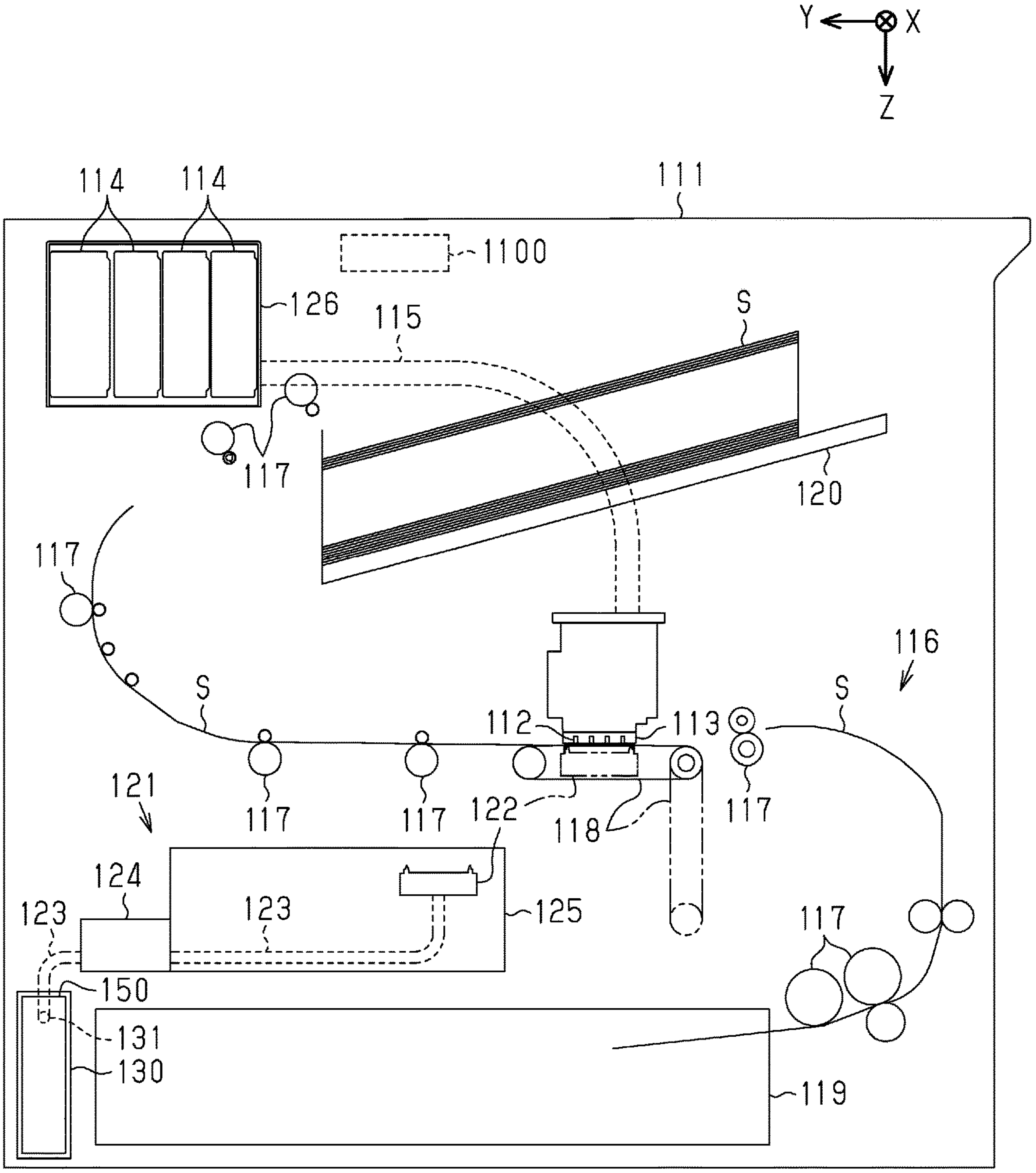
FIG. 9 is a schematic view of a liquid ejecting apparatus having a waste liquid container mounted therein.

As illustrated in FIG. 9, the liquid ejecting apparatus 111 includes: a liquid ejecting unit 113 having one or more nozzles 112 capable of ejecting ink droplets; a supply flow channel 115 for supplying a liquid from a liquid supply source 114 toward the liquid ejecting unit 113; a transport device 116 that transports the medium S; and a controller 1100 that controls these components. Assuming that a position where the liquid ejecting unit 113 ejects the liquid is a recording position, the transport device 116 includes a plurality of transport rollers 117 that transport the medium S along a transport path passing through the recording position; and a transport belt 118 that transports the medium S at the recording position. Among directions along the Y-axis, a transport direction of the medium S at the recording position is a +Y direction.

The liquid ejecting unit 113 of this embodiment is a line head having a recording range that covers the entire width of the medium S in a direction along an X-axis that intersects the Y-axis and the Z-axis. In this embodiment, the X-axis, the Y-axis, and the Z-axis are orthogonal to each other. In this embodiment, the +Z direction, which is the direction of gravity, is set as the ejecting direction, but the diagonal direction that intersects both the horizontal direction and the gravity direction may be set as the ejecting direction.

The liquid supply source 114 can be, for example, a cartridge-type liquid container that is detachably mounted in a container mounting portion 126 included in the liquid ejecting apparatus 111. In addition, the liquid supply source 114 may supply the liquid by injecting the liquid into a liquid tank mounted in the container mounting portion 126.

The liquid ejecting apparatus 111 includes: a storage cassette 119 capable of storing a plurality of media S to be recorded; a holding tray 120 that holds the recorded medium S; a maintenance device 121 that performs maintenance of the liquid ejecting unit 113; and a mounting portion 130 that detachably mounts a waste liquid container 150 capable of containing a liquid as a waste liquid discharged through maintenance of the liquid ejecting unit 113 or the like.

In the liquid ejecting apparatus 111, maintenance operations such as flushing, capping, and suction cleaning are performed in the liquid ejecting unit 113 in order to prevent or eliminate poor ejection caused by clogging of the nozzle 112, adhesion of foreign matter or the like. The maintenance device 121 includes: a cap 122; a waste liquid flow channel 123 that couples the cap 122 to the mounting portion 130; a suction pump 124 provided in the middle of the waste liquid flow channel 123; and a moving mechanism 125.

The moving mechanism 125 moves the cap 122 between a retreat position indicated by the solid line in FIG. 9 and a capping position indicated by the dashed-two dotted line in FIG. 9. At the capping position, the cap 122 is in contact with the liquid ejecting unit 113. When the cap 122 is moved to the capping position, the transport belt 118 retreats from a supporting position indicated by the solid line in FIG. 9 to the retreat position indicated by the dashed-two dotted line in FIG. 9.

Capping is performed by the cap 122 moving to the capping position and coming into contact with the liquid ejecting unit 113 so as to surround the nozzle 112. When the liquid is not ejected, capping is performed to prevent the nozzle 112 from getting dried, thus preventing the occurrence of poor ejection.

Flushing is performed to forcibly eject (discharge) liquid droplets from the nozzle 112 regardless of recording, thereby discharging foreign matter, bubbles, or altered liquid that cause poor ejection. The altered liquid is, for example, an ink thickened by evaporation of a solvent component. The liquid discharged as a waste liquid by flushing may be received by the cap 122, or a flushing box may be separately provided to receive the waste liquid discharged by flushing.

When the suction pump 124 is driven with the cap 122 arranged at the capping position and a negative pressure is applied to the nozzle 112, suction cleaning is executed to suck and discharge the liquid from the nozzle 112 by the negative pressure. The liquid discharged from the nozzle 112 by the suction cleaning is stored as a waste liquid in the waste liquid container 150. When the waste liquid discharged by flushing is received by the cap 122, the waste liquid received by the cap 122 is stored in the waste liquid container 150 through the waste liquid flow channel 123 by driving the suction pump 124 with the cap 122 separated from the liquid ejecting unit 113.

At the beginning of use of the liquid ejecting apparatus 111, suction cleaning is performed to fill a liquid flowing region from the liquid supply source 114 to the nozzle 112 with the liquid. This is called initial filling.

Figure 10:
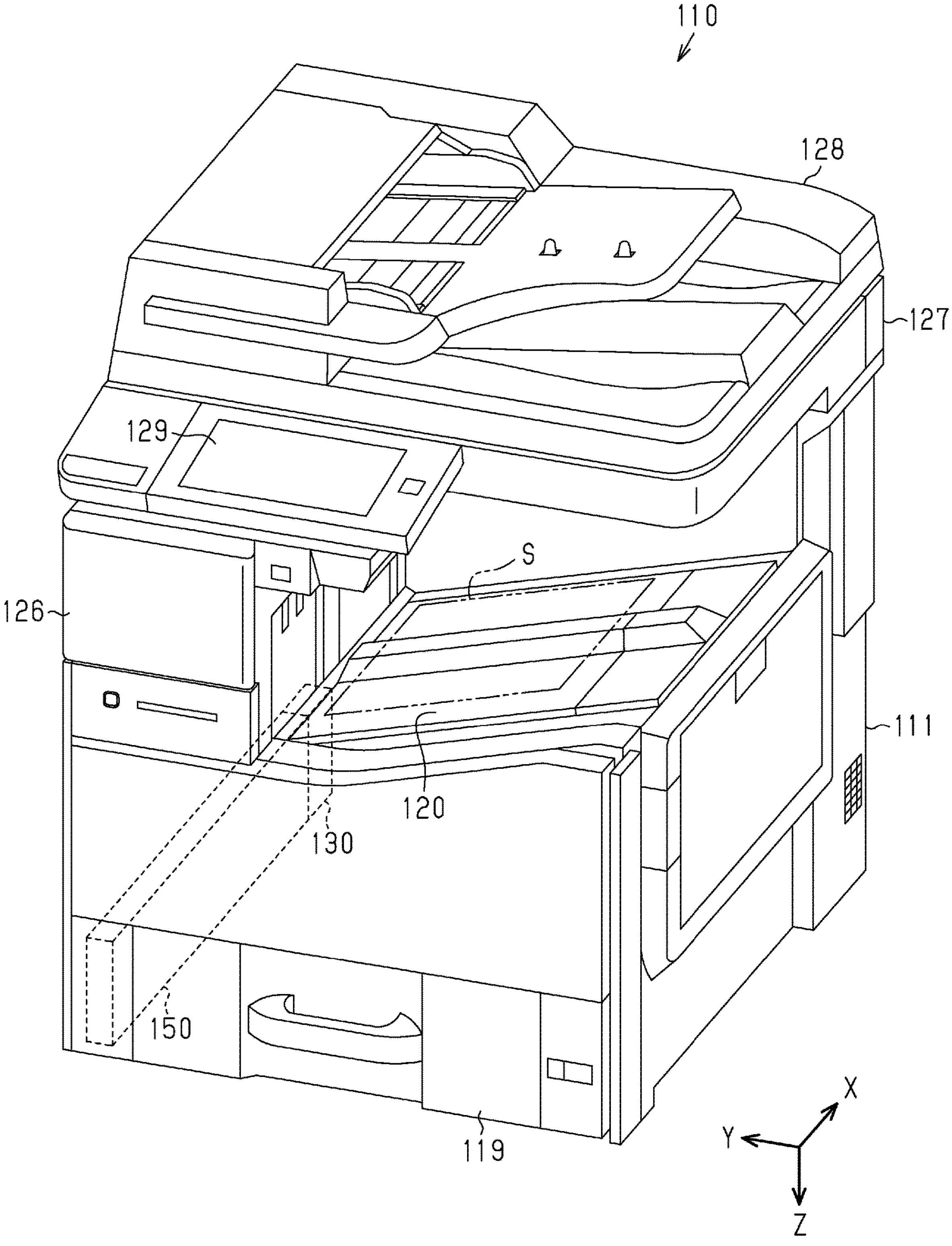
FIG. 10 is a perspective view of a multifunction machine including the liquid ejecting apparatus of FIG. 9.

As illustrated in FIG. 10, the liquid ejecting apparatus 111 can be a multifunction machine 110 having an image reader 127 and an automatic feeder 128 mounted in its vertically upper part. When the storage cassette 119, the holding tray 120 or the container mounting portion 126 is operated from the front, an operation unit 129 formed of a liquid crystal panel or the like may be provided at a position on the front of the multifunction machine 110. In this case, the liquid ejecting apparatus 111 can be operated by operating the operation unit 129.

In this embodiment, the mounting portion 130 is located near the bottom below the container mounting portion 126 in the liquid ejecting apparatus 111, and is located near the downstream end portion in the transport direction, that is, near the left end portion when seen from the front. The waste liquid container 150 is mounted on the mounting portion 130 along with the movement from the front to the rear in the +X direction with respect to the liquid ejecting apparatus 111. Thus, the +X direction is a mounting direction. On the other hand, the −X direction that is opposite thereto is the direction in which the waste liquid container 150 is taken out, and thus is a takeout direction. The direction along the X-axis of the waste liquid container 150 is a longitudinal direction. The mounting portion 130 is arranged in the back of the liquid ejecting apparatus 111 in the mounting direction, that is, at the rear on the +X side.

Next, the configuration of the mounting portion 130 will be described in detail.

Figure 11:
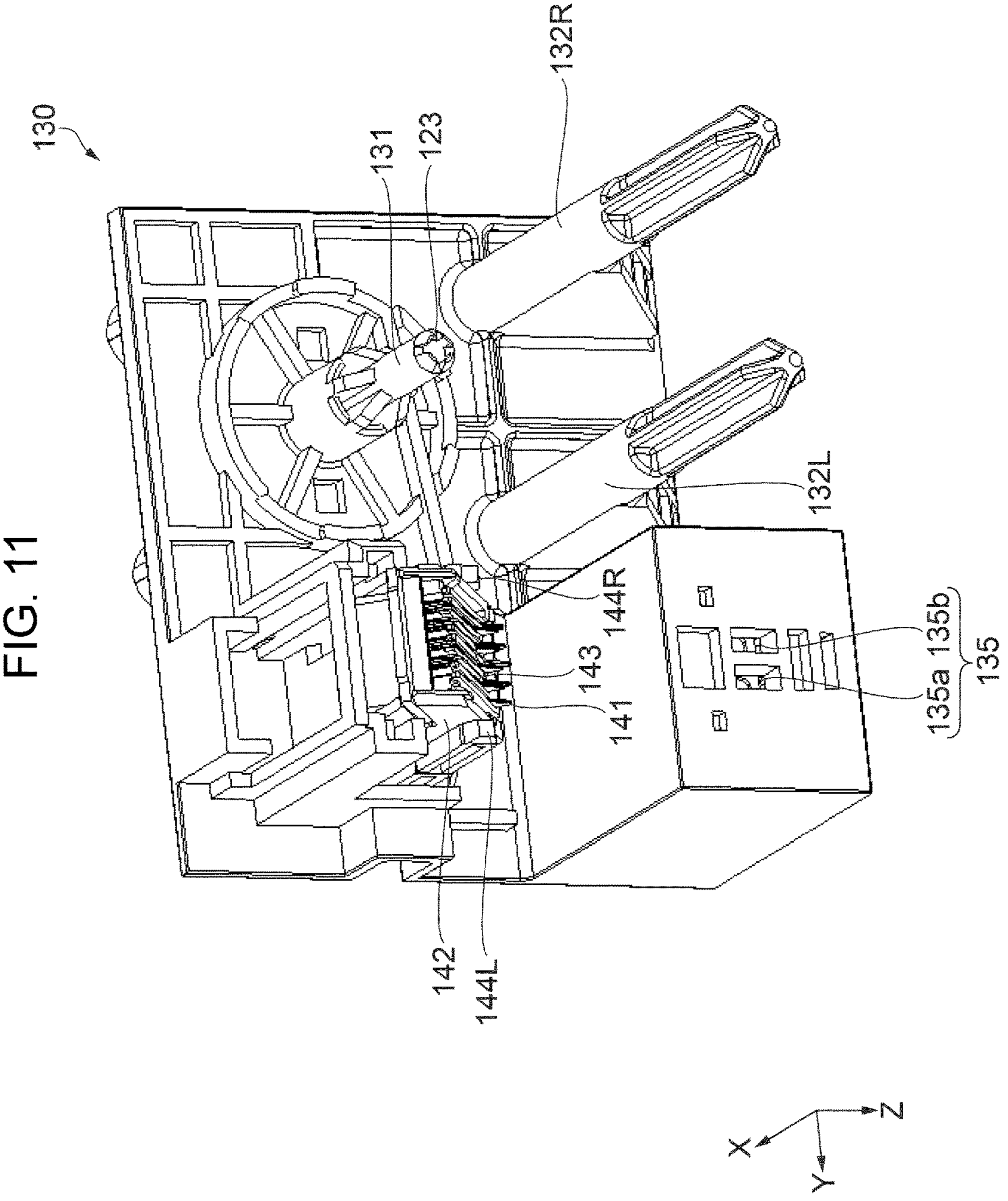
FIG. 11 is a perspective view of a mounting portion where the waste liquid container is mounted.

As illustrated in FIG. 11, the mounting portion 130 includes: a discharge unit 131 for discharging the waste liquid; two positioning sections 132L and 132R for positioning the waste liquid container 150; an apparatus-side terminal section 141 electrically coupled to the waste liquid container 150; and an optical sensor 135 that detects a state of the waste liquid contained in the waste liquid container 150.

In the mounting portion 130, the discharge unit 131 and the apparatus-side terminal section 141 are arranged side by side along the Y-axis, and the apparatus-side terminal section 141 is located on the +Y side of the discharge unit 131. The two positioning sections 132L and 132R are arranged along the Y-axis below the discharge unit 131, that is, on the +Z side. The optical sensor 135 is arranged on the +Z side of the apparatus-side terminal section 141 and is located closer to the front in the mounting direction than the apparatus-side terminal section 141 is, that is, on the −X side.

The discharge unit 131 has a substantially cylindrical shape protruding in the −X direction, and a downstream end of the waste liquid flow channel 123 opens at the tip of the cylinder. The mounting portion 130 has a terminal holder 142 protruding in the −X direction like the discharge unit 131, and the apparatus-side terminal section 141 is held in an inclined posture by the terminal holder 142.

The optical sensor 135 is a reflective optical sensor including a light emitting section 135*a* that emits light and a light receiving section 135*b* that receives light. The light emitting section 135*a* has a light emitting diode, for example, and is arranged at a position where light is emitted in the −X direction toward the waste liquid container 150 mounted on the mounting portion 130. The light receiving section 135*b* has a phototransistor, for example, and is arranged at a position where the reflected light of the light emitted by the light emitting section 135*a* to the waste liquid container 150 can be received.

The terminal holder 142 has an inclined surface 143 formed so as to obliquely intersect both the gravity direction and the mounting direction so that the −X side, which is the tip side, is higher than the +X side, which is the base end side. The apparatus-side terminal section 141 is configured as a leaf spring that can protrude obliquely downward so as to intersect the inclined surface 143.

The terminal holder 142 has a pair of guide protrusions 144L and 144R located on the +Y and −Y sides of the inclined surface 143. The guide protrusion 144L is arranged on the +Y side of the inclined surface 143, while the guide protrusion 144R is arranged on the −Y side of the inclined surface 143.

Next, an embodiment of the waste liquid container 150 will be described with reference to the drawings.

The waste liquid container 150 of this embodiment stores a waste liquid such as waste ink generated by a maintenance operation such as suction cleaning in the liquid ejecting apparatus 111 in a mounted state where the waste liquid container 150 is mounted on the mounting portion 130.

Figure 12:
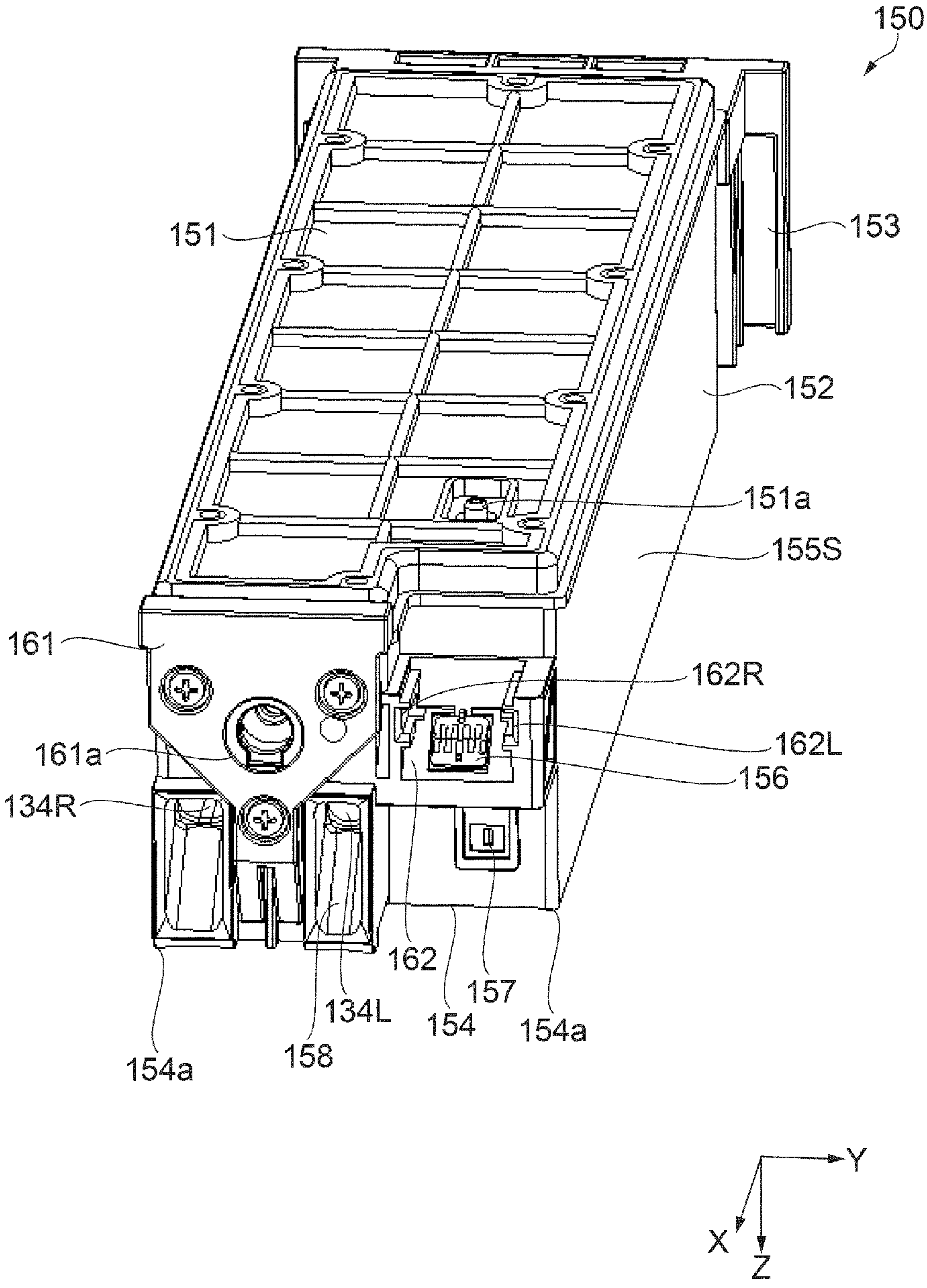
FIG. 12 is a perspective view illustrating an embodiment of the waste liquid container.
Figure 13:
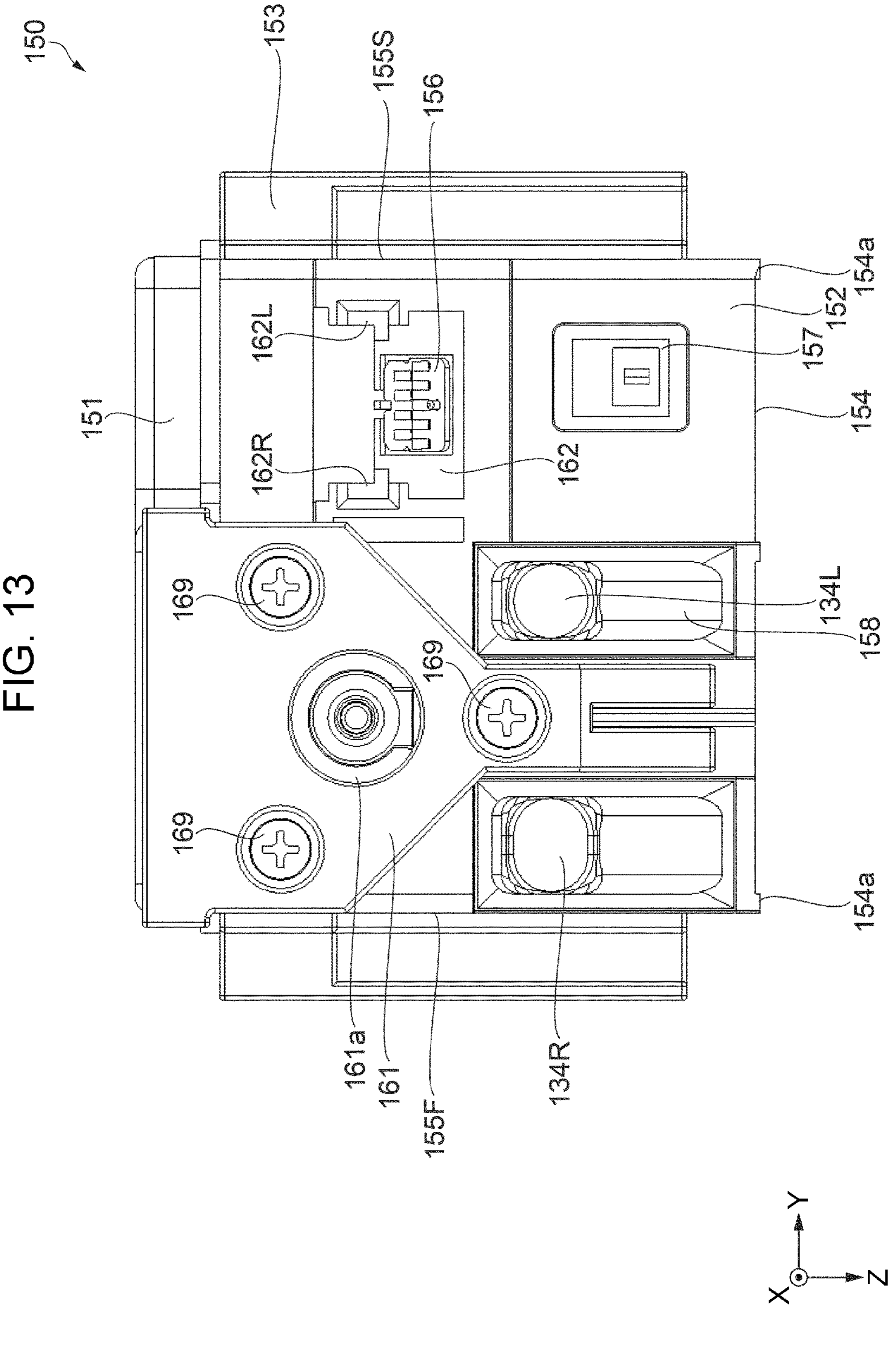
FIG. 13 is a front view of the waste liquid container of FIG. 12.

As illustrated in FIG. 12, the waste liquid container 150 has a substantially rectangular parallelepiped shape in which a direction along the X-axis is a longitudinal direction and a direction along the Y-axis is a width direction. In the description of the waste liquid container 150, the +Z direction is the direction of gravity at the time of mounting in the liquid ejecting apparatus 111. The waste liquid container 150 includes: a bottomed box-shaped storage case 152 having an opening on the upper side in the mounted state; and a plate-shaped lid member 151 covering the opening of the storage case 152. The storage case 152 and the lid member 151 form a storage chamber 170 (see FIG. 19) capable of storing the waste liquid.

As illustrated in FIG. 12, it is preferable that the lid member 151 is provided with a ventilation hole 151*a*. Thus, the introduction of the waste liquid into the waste liquid container 150 and the evaporation of the introduced waste liquid can be facilitated.

As illustrated in FIGS. 12 to 16, a case bottom 154 of the storage case 152 has a larger area than case side walls 155F and 155S that intersect the case bottom 154 and extend along the X-axis. A pair of guide rails 154*a* extending along the X-axis are provided so as to project from the case bottom 154. The liquid ejecting apparatus 111 is provided with a guide unit (not illustrated) that engages with the guide rails 154*a* when the waste liquid container 150 is mounted.

Figure 14:
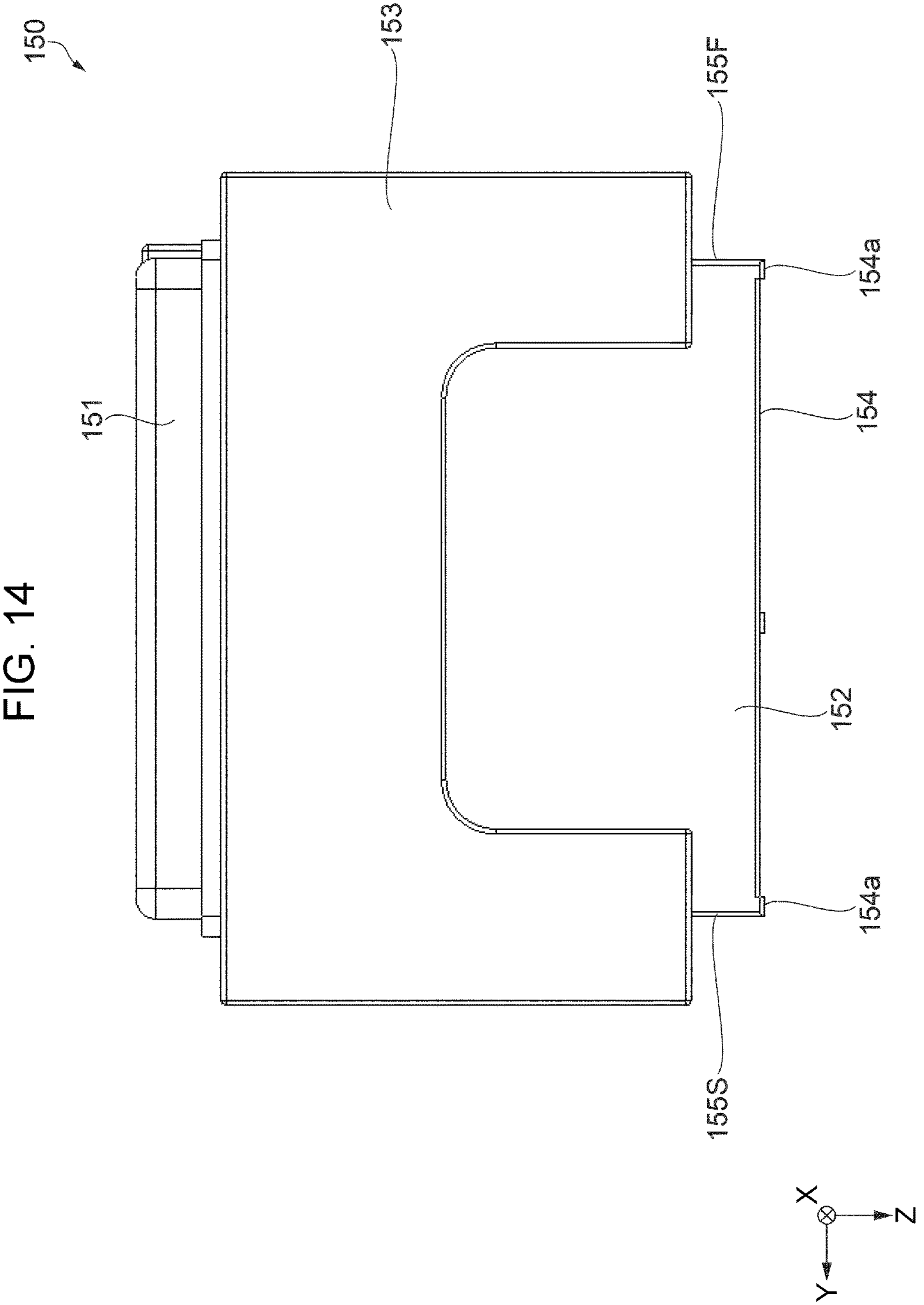
FIG. 14 is a rear view of the waste liquid container of FIG. 12.
Figure 15:
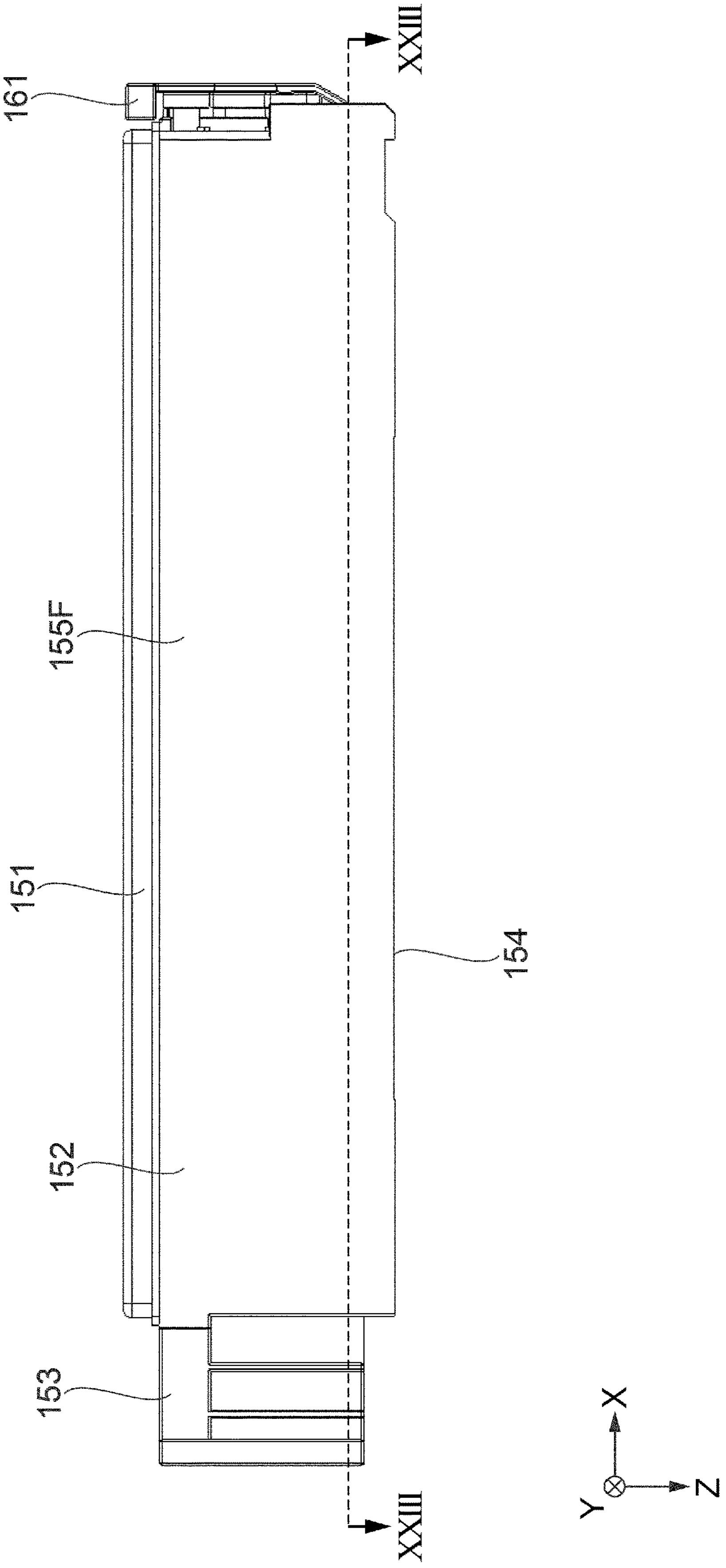
FIG. 15 is a side view of the waste liquid container of FIG. 12.
Figure 16:
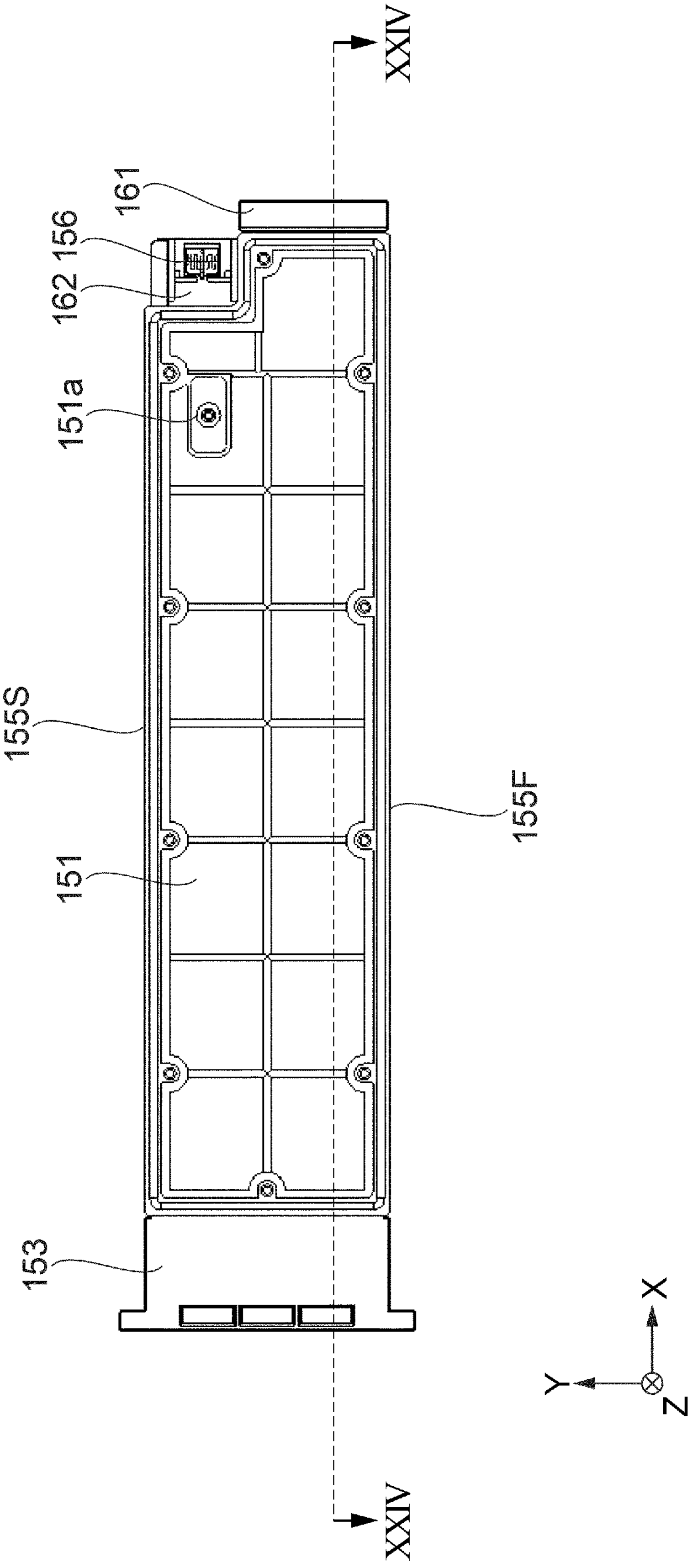
FIG. 16 is a top view of the waste liquid container of FIG. 12.

As illustrated in FIG. 14, the storage case 152 has a handle portion 153 at its end on the front side in the mounting direction, that is, on the −X side. The handle portion 153 is intended to be grabbed by a hand when the waste liquid container 150 is removed from the liquid ejecting apparatus 111. The handle portion 153 may be formed so as to project from the storage case 152, or may be formed by providing a recess into which a hand can be inserted.

As illustrated in FIG. 12, the storage case 152 includes: a coupling section 161 coupled to the discharge unit 131 in the mounted state in the mounting portion 130 at the end on the back side in the mounting direction, that is, on the +X side; and a container-side terminal portion 156 electrically coupled to the apparatus-side terminal section 141 in the mounted state in the mounting portion 130. The coupling section 161 has a coupling opening 161*a* that opens in the mounting direction in a manner that allows coupling to the discharge unit 131. The coupling opening 161*a* is communicated with the storage chamber 170 (see FIG. 19) that is a space inside the waste liquid container 150. The container-side terminal portion 156 is preferably arranged between the two guide rails 154*a* in the direction along the Y-axis.

In the width direction of the waste liquid container 150, that is, in the direction along the Y-axis, the coupling opening 161*a* is arranged on the −Y side and a coupling recess 162 is formed on the +Y side of the coupling opening 161*a* so as to open in the +X direction and the −Z direction in the mounted state. A bottom surface of the coupling recess 162 has a slope that is higher on the −X side than on the +X side so as to face the inclined surface 143 of the mounting portion 130, and the container-side terminal portion 156 is provided on the bottom surface, that is, on the upward slope of the coupling recess 162. Thus, the container-side terminal portion 156 is provided at a position aligned with the coupling opening 161*a* in the width direction. The container-side terminal portion 156 is formed of a circuit board having a plurality of terminals formed on its front surface, and a memory (not illustrated) electrically coupled to the plurality of terminals is arranged on the back surface of the circuit board. In the coupling recess 162, guide recesses 162L and 162R that can be engaged with the guide protrusions 144L and 144R of the terminal holder 142 are provided at positions on the +Y and −Y sides of the container-side terminal portion 156.

In the storage case 152, two positioning recesses 134L and 134R arranged along the Y-axis are provided on the +Z side of the coupling opening 161*a*. When the waste liquid container 150 is mounted on the mounting portion 130, the positioning sections 132L and 132R are inserted into the positioning recesses 134L and 134R, respectively.

In the storage case 152, a reflector 157 is provided below the container-side terminal portion 156, that is, in the +Z direction. The reflector 157 can reflect the light emitted by the light emitting section 135*a* of the optical sensor 135 toward the light receiving section 135*b* in the mounted state in the mounting portion 130. More specifically, the reflector 157 is provided so as to face the mounting direction.

Thus, in the mounted waste liquid container 150, the coupling opening 161*a* is arranged on the −Y side, which is one side in the width direction, and the container-side terminal portion 156 and the reflector 157 are provided on the +Y side, which is the other side in the width direction. The container-side terminal portion 156 is arranged on the takeout direction side of the coupling opening 161*a*, that is, on the −X side, and the reflector 157 is arranged further on the takeout direction side of the container-side terminal portion 156.

In the width direction of the storage case 152, a recess 158 that is recessed in the −X direction is provided between the coupling opening 161*a* and the container-side terminal portion 156. The recess 158 can be considered to be arranged between the coupling opening 161*a* and the reflector 157 in the width direction, together with the positioning recess 134L.

Figure 17:
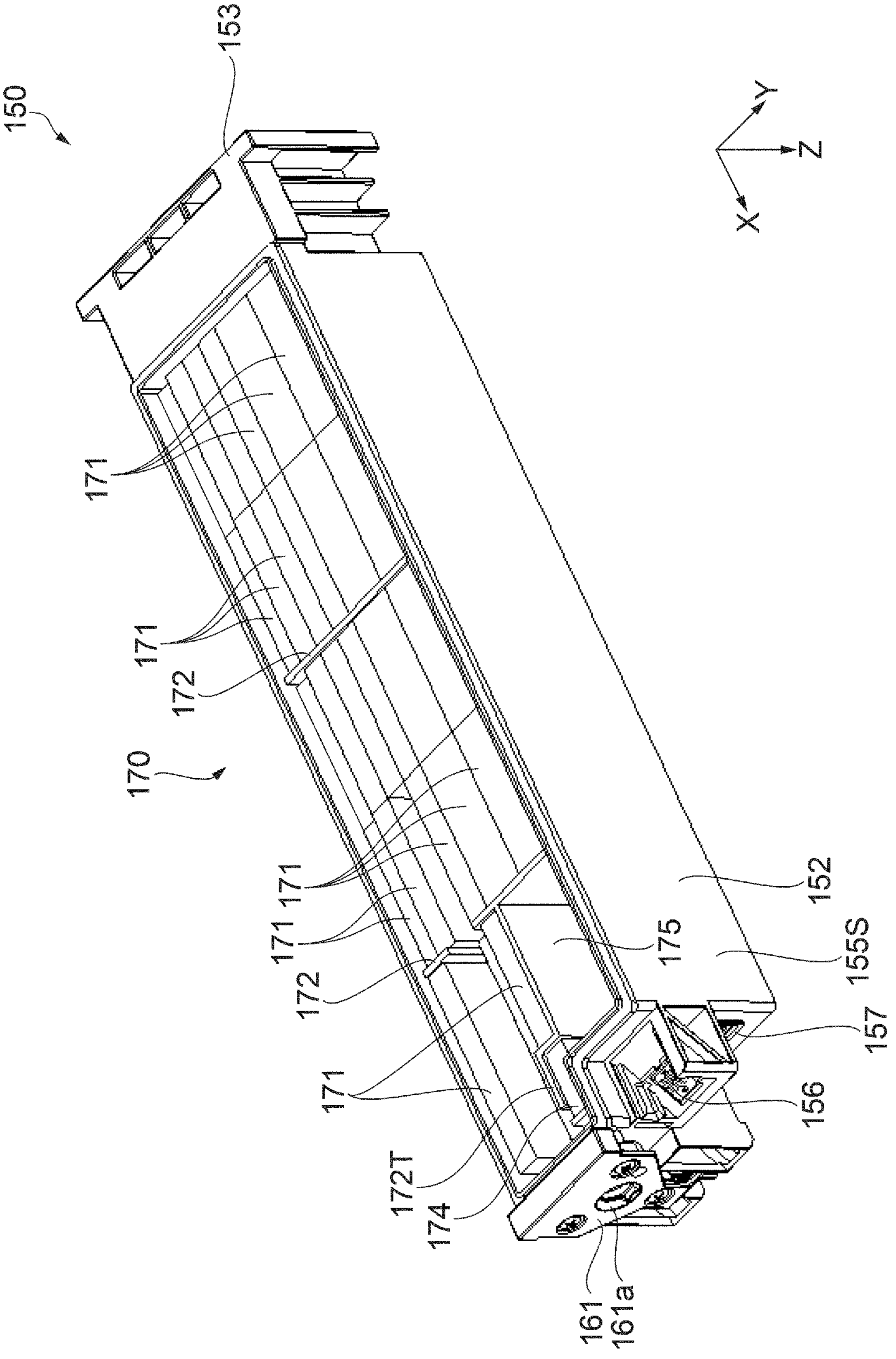
FIG. 17 is an exploded perspective view of the waste liquid container of FIG. 12.

As illustrated in FIG. 17, the storage case 152 has a bottomed box shape that opens upward in the mounted state, and the waste liquid container 150 includes a plurality of waste liquid absorbers 171 and a protective absorbers 174, which are housed in the storage case 152, that is, in the storage chamber 170. The waste liquid absorbers 171 and the protective absorber 174 are made of, for example, a plate-shaped porous body, and can absorb and hold the waste liquid by the capillary force of the pores thereof.

Figure 18:
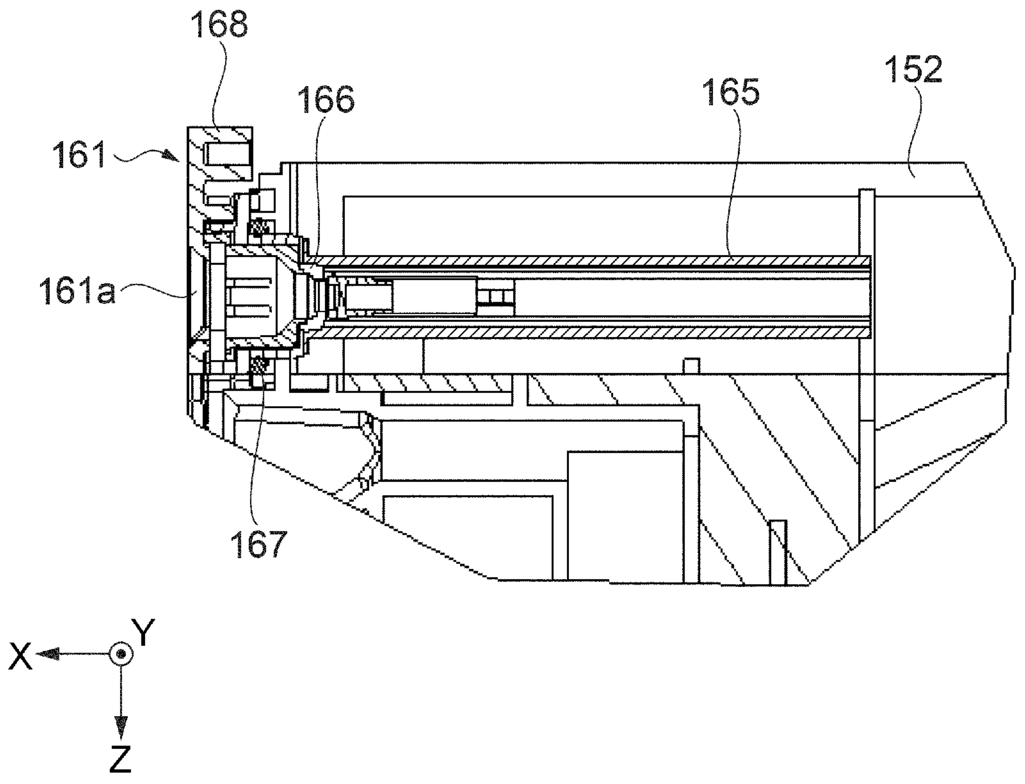
FIG. 18 is an enlarged sectional view of the waste liquid container of FIG. 12.

As illustrated in FIG. 18, the coupling section 161 includes a cylindrical insertion tube 165, sealing members 166 and 167, and a fixing member 168. The sealing member 166 is used as a seal between the insertion tube 165 and the discharge unit 131 in the mounted state where the waste liquid container 150 is mounted on the mounting portion 130. The sealing member 167 is used as a seal between the storage case 152 and the insertion tube 165. The fixing member 168 is fixed to the storage case 152 with a screw 169 (see FIG. 13) so that the insertion tube 165 and the sealing members 166 and 167 are held by the storage case 152. A coupling opening 161*a* is formed in the fixing member 168, and when the fixing member 168 is fixed to the storage case 152, the coupling opening 161*a* and the storage chamber 170 are communicated with each other through the insertion tube 165.

Figure 19:
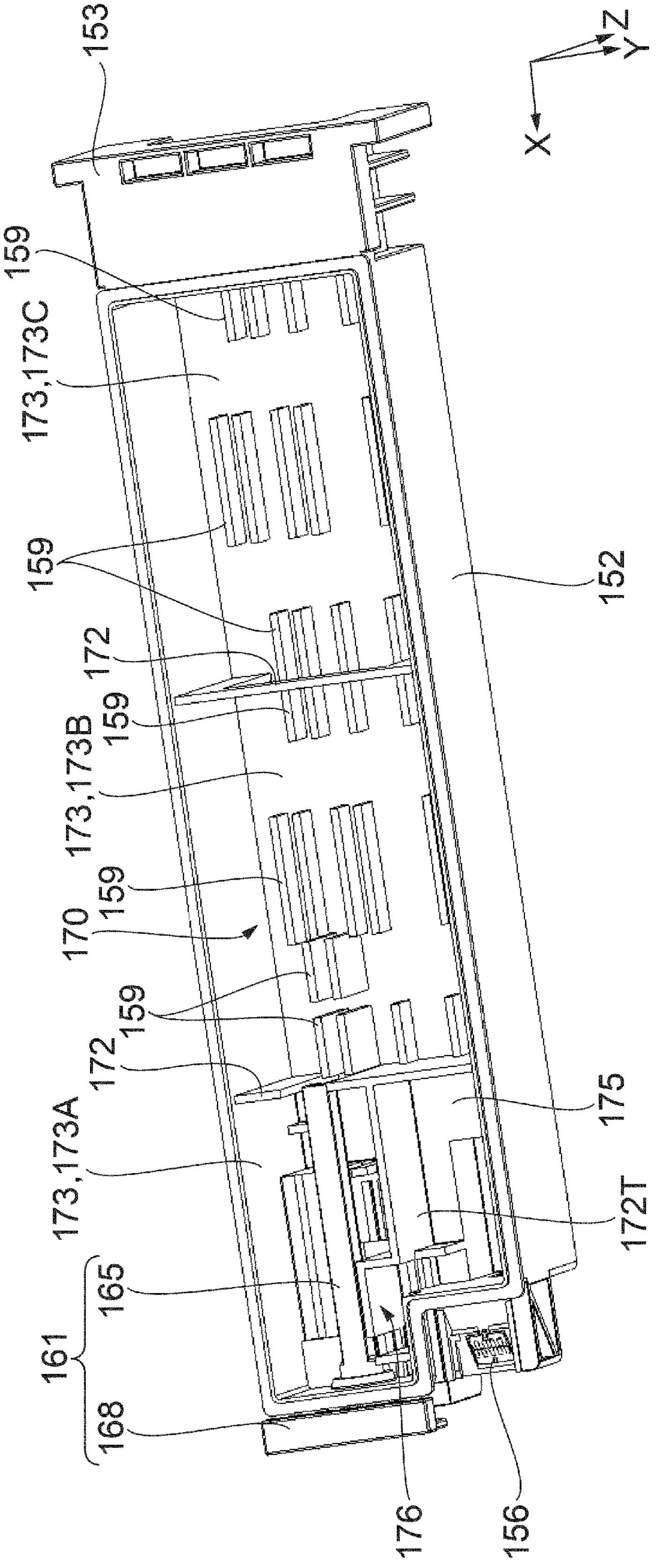
FIG. 19 is an exploded perspective view of the waste liquid container of FIG. 12.

As illustrated in FIG. 19, the storage chamber 170 as a space in the waste liquid container 150 includes a plurality of waste liquid storage chambers 173 that store the waste liquid and a detection chamber 175 used to detect the storage state of the waste liquid in the storage chambers 170. The plurality of waste liquid storage chambers 173 are partitioned by a plurality of partition plates 172 arranged at predetermined intervals in the longitudinal direction. In this embodiment, three waste liquid storage chambers 173A, 173B, and 173C are formed sequentially from the +X side. The insertion tube 165 of the coupling section 161 is arranged inside the waste liquid storage chamber 173A. The detection chamber 175 is arranged on the +Y side of the waste liquid storage chamber 173A, and is separated from the waste liquid storage chamber 173 by a partition plate 172T. In order to prevent the waste liquid from entering the detection chamber 175 from the waste liquid storage chamber 173A beyond the partition plate 172T, the waste liquid absorber 171 is preferably arranged so as to come into contact with the wall of the partition plate 172T on the waste liquid storage chamber 173A side.

Figure 20:
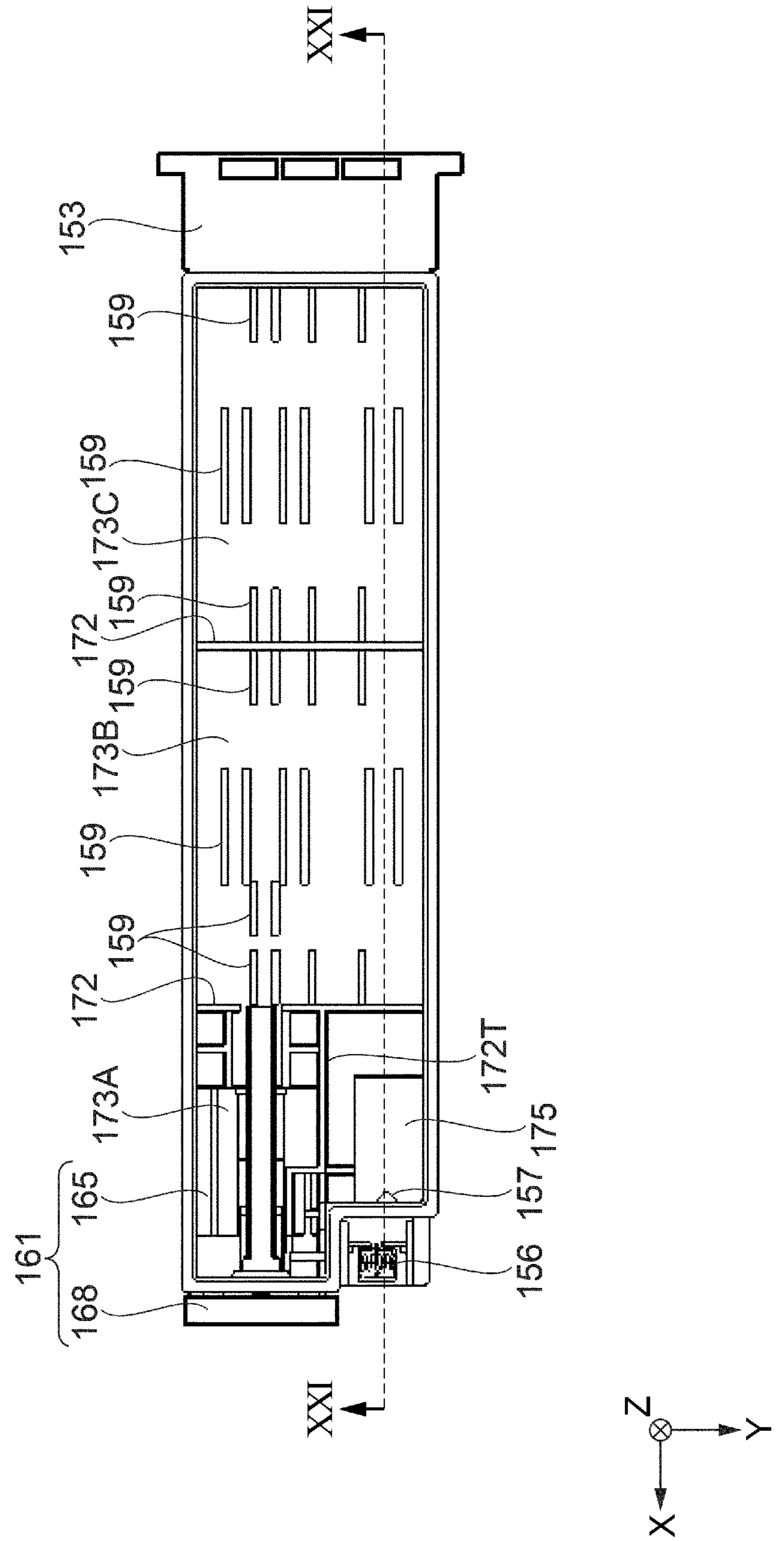
FIG. 20 is a top view of FIG. 19.
Figure 21:
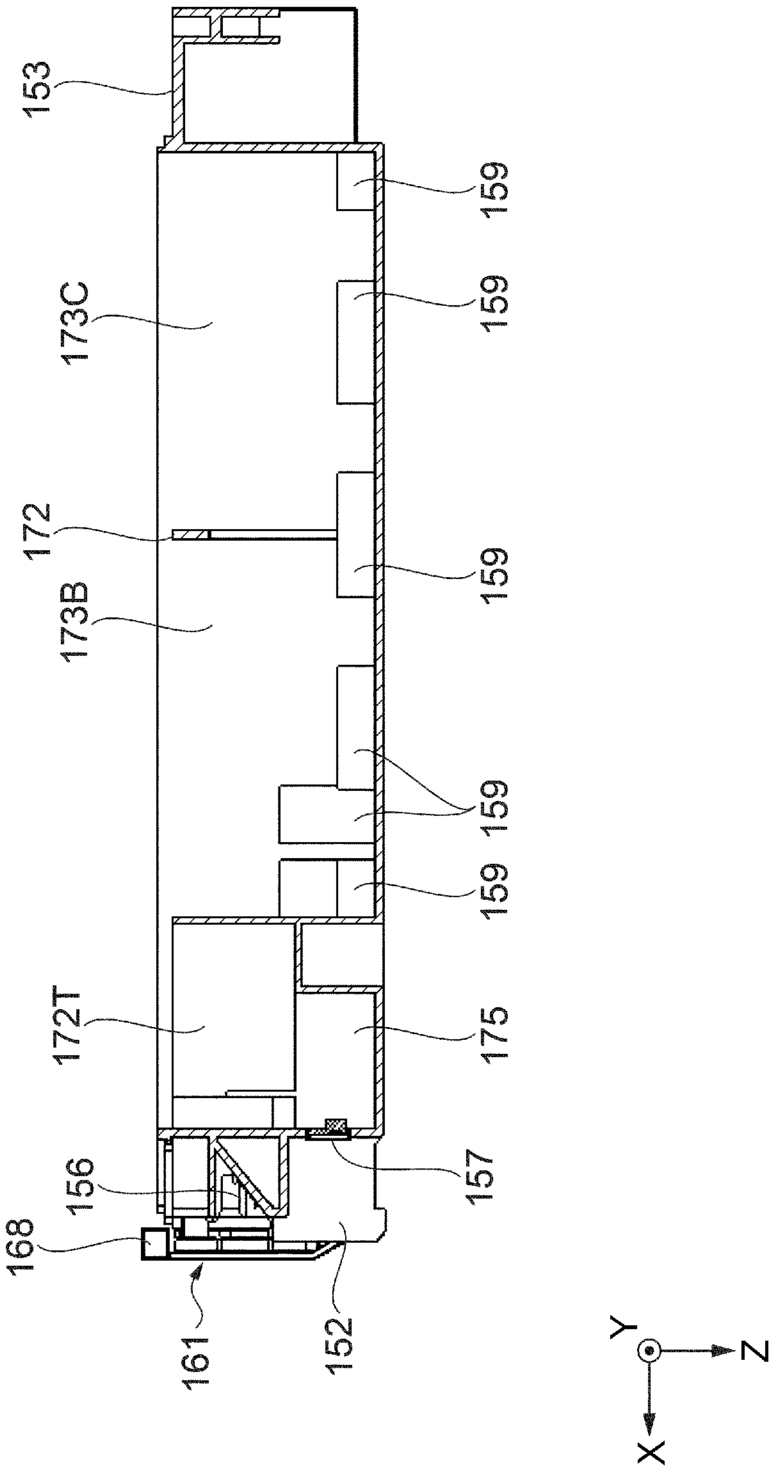
FIG. 21 is a sectional view taken along the line XXI-XXI in FIG. 20.

As illustrated in FIGS. 19 to 21, the partition plate 172 has an opening formed on the bottom side, that is, on the +Z side in the storage case 152, and the waste liquid storage chambers 173 are communicated with each other on the bottom side of the storage case 152. On the bottom surface of the storage case 152, a plurality of positioning ribs 159 extending along the X-axis are arranged for positioning of the waste liquid absorbers 171. In the storage case 152, the reflector 157 is arranged on the outer wall on the +X side of the detection chamber 175.

Figure 22:
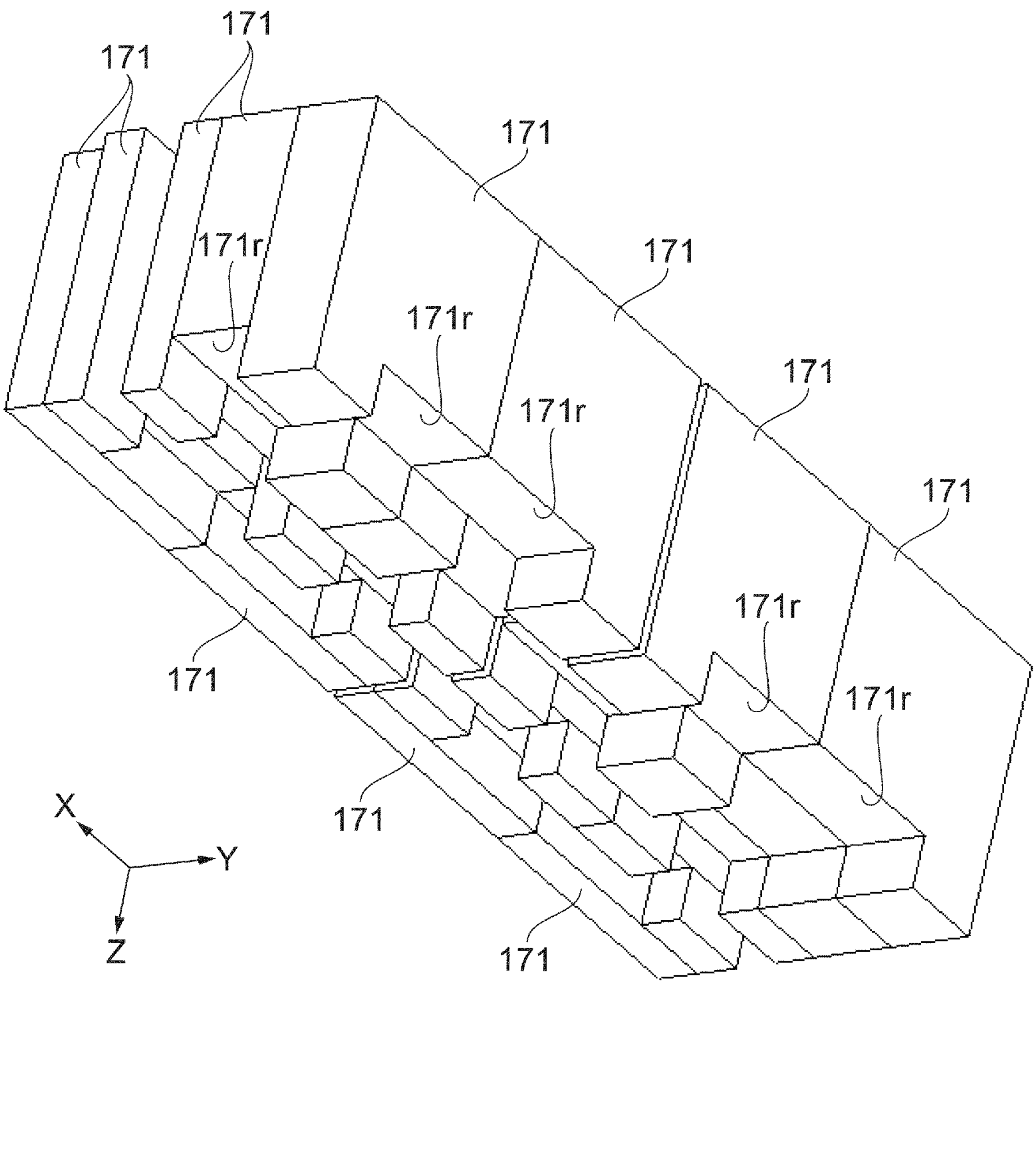
FIG. 22 is a perspective view of a waste liquid absorber included in the waste liquid container of FIG. 12.
Figure 23:
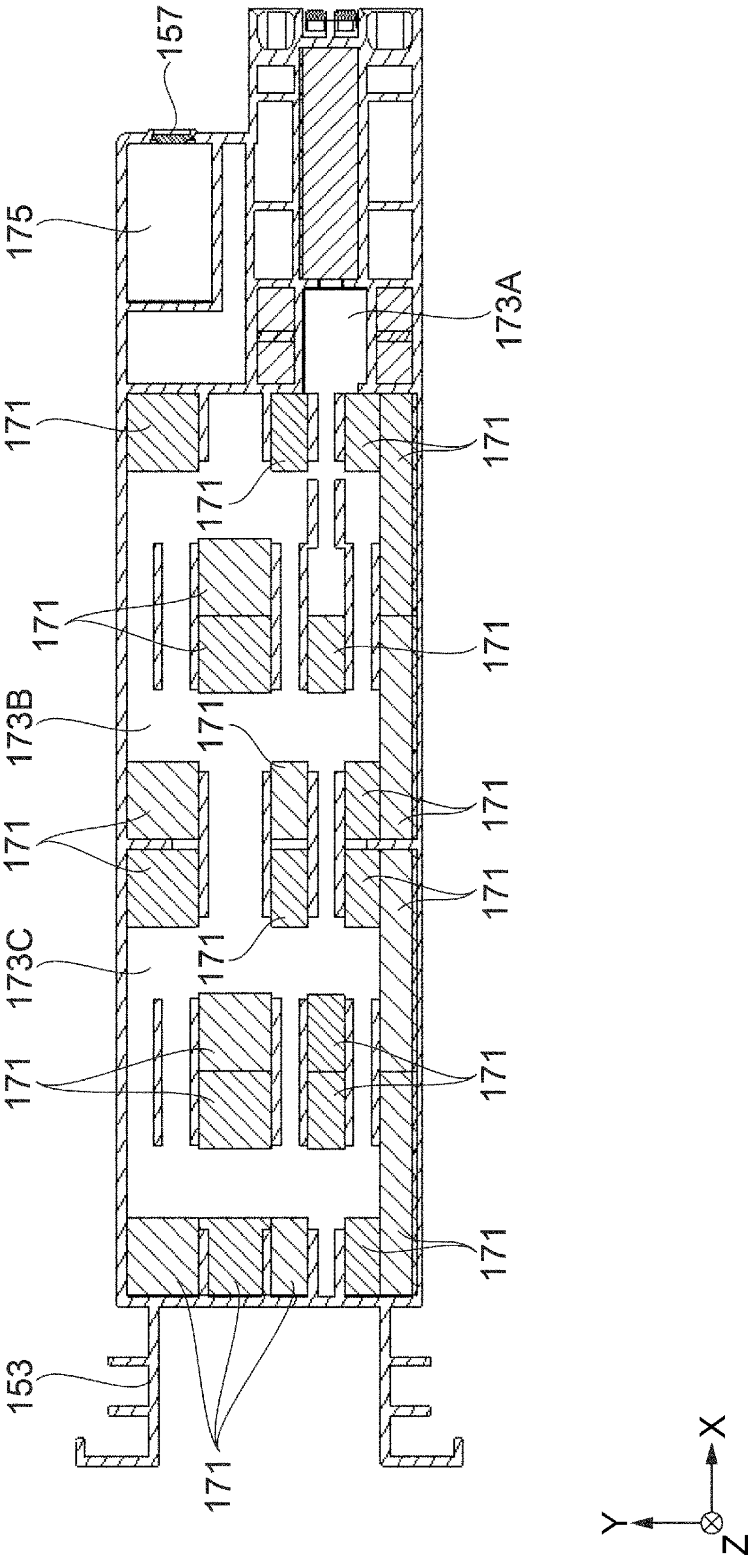
FIG. 23 is a sectional view taken along the line XXIII-XXIII in FIG. 15.

As illustrated in FIG. 22, notches 171*r* for forming a gap with the bottom surface of the storage case 152 are formed at the bottom of the waste liquid absorber 171 housed in the waste liquid storage chambers 173B and 173C. Therefore, as illustrated in FIG. 23, when the waste liquid absorbers 171 are arranged in the storage case 152, a space for communicating the three waste liquid storage chambers 173A, 173B, and 173C is formed at the bottom of the storage case 152.

Figure 24:
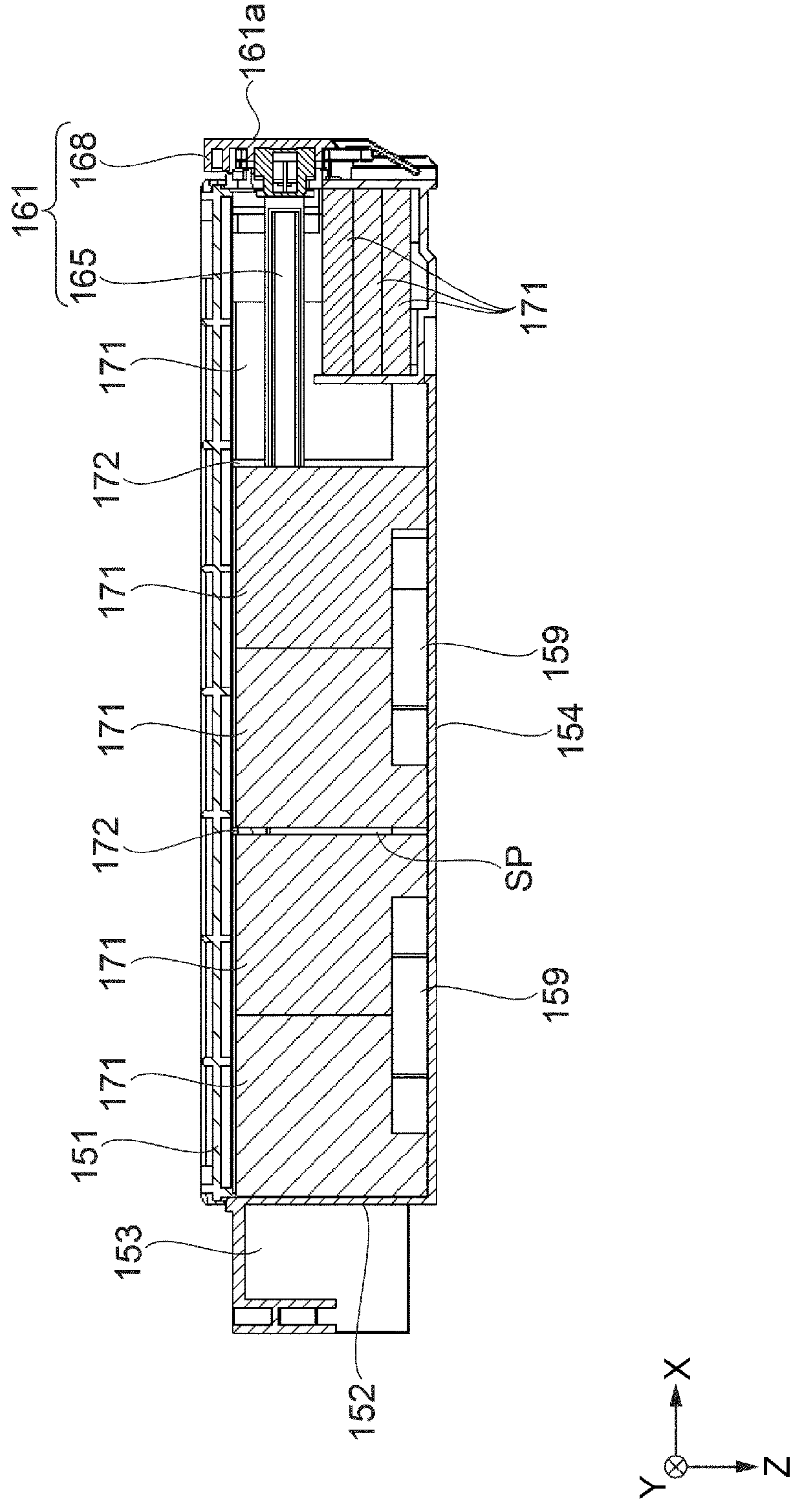
FIG. 24 is a sectional view taken along the line XXIV-XXIV in FIG. 16.

As described above, since the partition plate 172 has the opening formed on the bottom side of the storage case 152, a space SP is formed between the waste liquid absorbers 171 housed in the waste liquid storage chambers 173 adjacent to each other in the ±X direction below the partition plate 172 in the storage case 152 as illustrated in FIG. 24. This space SP is communicated with the space formed by the notches 171*r* at the bottom of the waste liquid absorbers 171. This communicating space is referred to as a waste liquid guide channel.

The waste liquid discharged from the discharge unit 131 to the storage case 152 through the insertion tube 165 flows into the waste liquid storage chambers 173A and 173B. The waste liquid then flows through the guide channel to the bottom of the waste liquid storage chamber 173. The guide channel is in contact with all the waste liquid absorbers 171 in the waste liquid container 150, and the waste liquid introduced into the waste liquid storage chamber 173 is efficiently absorbed by all the waste liquid absorbers 171 in the process of flowing through the guide channel without being unevenly absorbed by some of the waste liquid absorbers 171 near the introduction portion. When the amount of the waste liquid flowing through the guide channel is increased, a part of the waste liquid is absorbed by the waste liquid absorbers 171 while flowing vertically upward through the space SP.

If the volume of the guide channel is small, there is a risk that the introduced waste liquid flows out of the coupling opening 161*a* since the absorption by the waste liquid absorbers 171 cannot keep up with the inflow velocity of the waste liquid when a large amount of waste liquid is introduced into the waste liquid container 150 all at once time. Therefore, it is preferable that the volume of the guide channel is equal to or larger than the maximum amount of waste liquid discharged by single suction cleaning. On the other hand, when the volume of the guide channel is increased too much, the volume in which the waste liquid absorbers 171 are arranged is reduced, resulting in a reduction in capacity to absorb and hold the waste liquid. Thus, it is more preferable that the volume of the guide channel is set equal to the maximum amount of waste liquid discharged by single suction cleaning.

As illustrated in FIG. 19, in the storage case 152, the detection chamber 175 and the waste liquid storage chamber 173A are separated by the partition plate 172T, but are not completely separated and are communicated through the communicating space 176 provided on the +X side of the partition plate 172T. To be more specific, the detection chamber 175 and the waste liquid storage chamber 173A are communicated with each other at a position closer to the base end than the tip of the insertion tube 165 that discharges the waste liquid into the waste liquid storage chamber 173.

As illustrated in FIG. 17, the protective absorber 174 is arranged in the communicating space 176 so as to block the communication between the detection chamber 175 and the waste liquid storage chamber 173A. The bottom surface of the communicating space 176 is located higher than the bottom surface of the waste liquid storage chamber 173A, that is, on the −Z side. When suction cleaning is repeated and the amount of waste liquid that cannot be absorbed by the waste liquid absorbers 171 is stored in the waste liquid storage chamber 173, the outside of the waste liquid absorber 171, that is, the space inside the waste liquid storage chamber 173 is filled with the waste liquid. Therefore, the level of the waste liquid rises every time the suction cleaning is performed. Then, when the level of the waste liquid reaches the height of the bottom surface of the communicating space 176, the waste liquid starts to be absorbed by the protective absorber 174. When more suction cleaning is repeatedly performed and the amount of waste liquid that cannot be absorbed by the protective absorber 174 flows in, the waste liquid flows from the protective absorber 174 into the detection chamber 175.

Next, description is given of the mounting operation of the waste liquid container 150 in the mounting portion 130 and the action of the waste liquid container 150.

Figure 25:
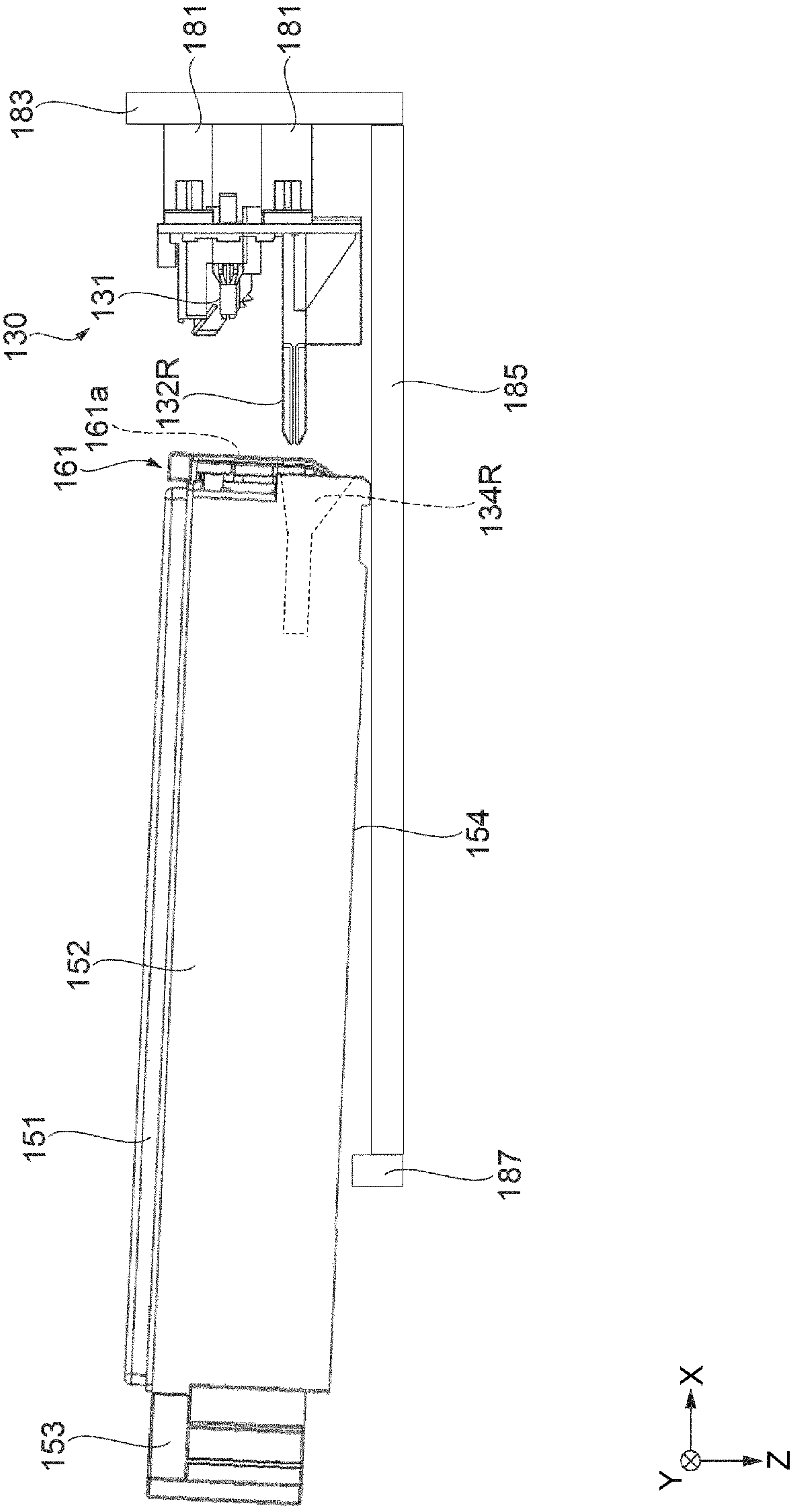
FIG. 25 is a side view illustrating a state before the waste liquid container of FIG. 12 is mounted on the mounting portion.
Figure 26:
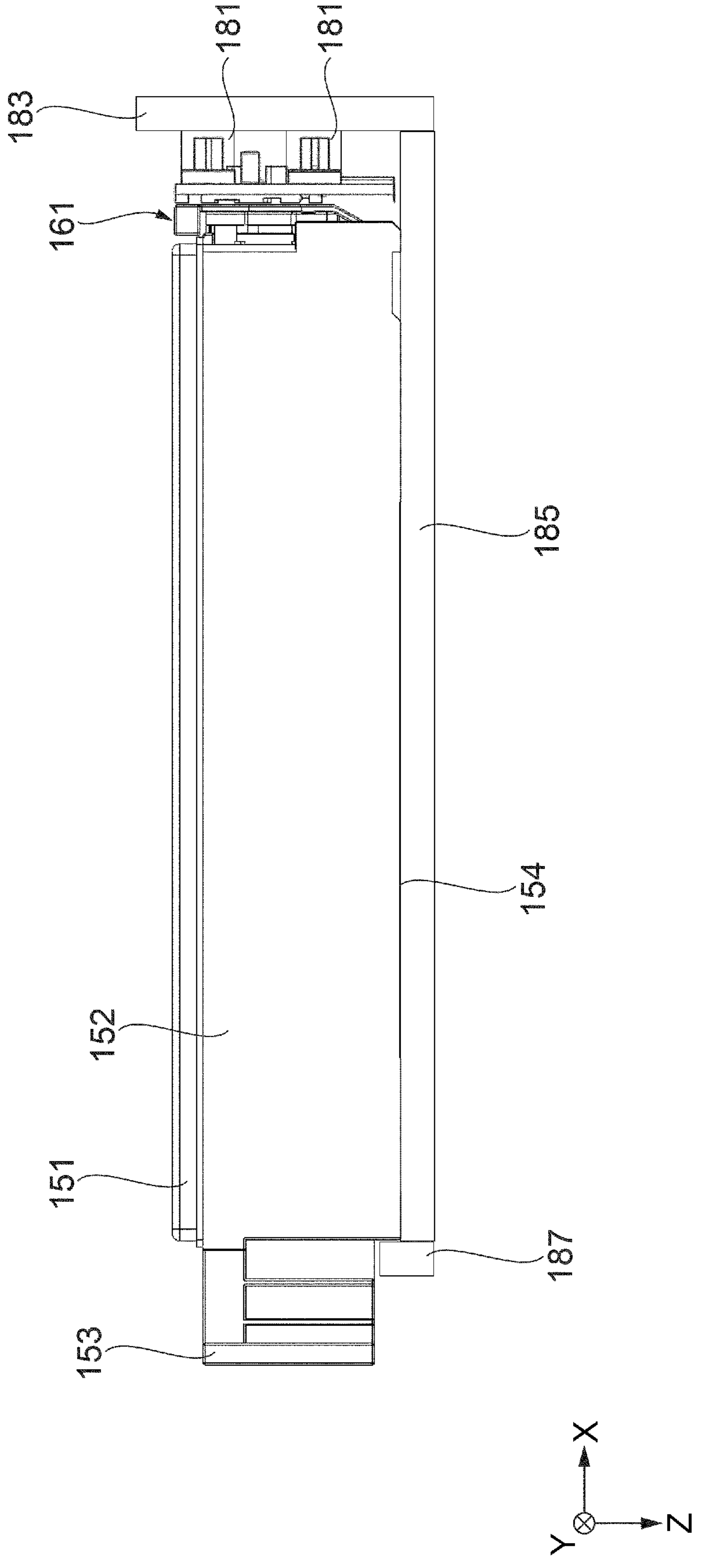
FIG. 26 is a side view illustrating a state where the waste liquid container of FIG. 12 is mounted on the mounting portion.

As illustrated in FIGS. 25 and 26, the mounting portion 130 is arranged on the −X side of a back base 183 fixed to the apparatus main body of the liquid ejecting apparatus 111. The mounting portion 130 is coupled to the back base 183 with one or more springs 181 and is urged in the −X direction by the springs 181. The back base 183 is fixed to a bottom base 185 at its end on the +Z side. The bottom base 185 is a plate-shaped member extending in the −X direction from the back base 183 and has a substantially horizontal upper surface. A retaining protrusion 187 protruding in the −Z direction is provided at the −X side end of the bottom base 185.

As illustrated in FIG. 25, when the waste liquid container 150 is moved in the +X direction with respect to the mounting portion 130 in a state where the +X-side end of the case bottom 154 of the waste liquid container 150 is in contact with the bottom base 185, the discharge unit 131 is coupled to the coupling section 161 of the waste liquid container 150. In this event, the positioning sections 132L and 132R are inserted into the positioning recesses 134L and 134R to determine the position of the waste liquid container 150 in the ±Y direction.

Figure 27:
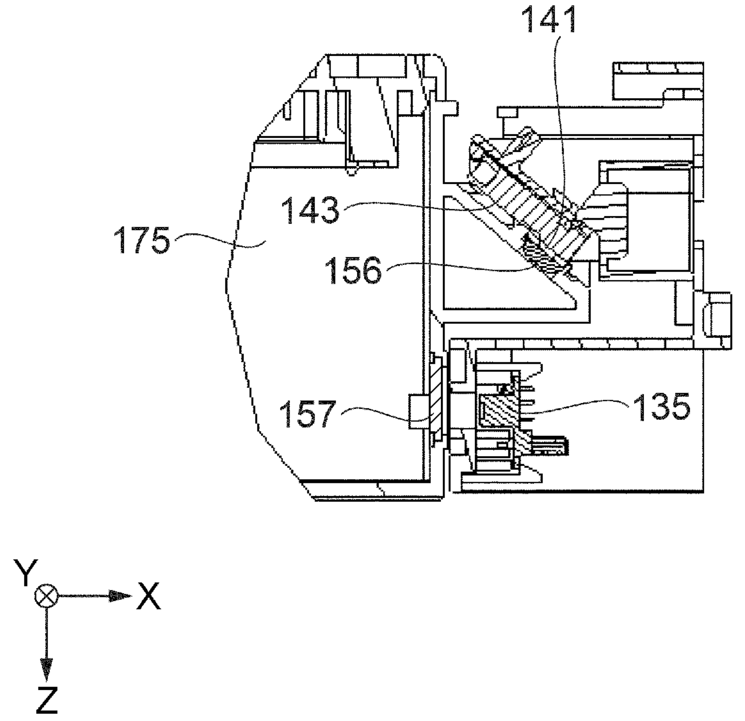
FIG. 27 is an enlarged sectional view illustrating a state where the waste liquid container of FIG. 12 is mounted on the mounting portion.

Then, as illustrated in FIG. 26, when the −X side end of the case bottom 154 goes beyond the retaining protrusion 187, the −X side end is lowered in the +Z direction and placed on the bottom base 185, the position of the waste liquid container 150 in the ±Z direction is determined. At the same time, as for the waste liquid container 150 urged in the −X direction by the spring 181, the movement thereof in the −X direction is regulated by the retaining protrusion 187, and thus the position thereof in the ±X direction is determined. In this event, as illustrated in FIG. 27, the reflector 157 of the waste liquid container 150 is arranged at a position facing the optical sensor 135.

In this event, the container-side terminal portion 156 and the apparatus-side terminal section 141 are electrically coupled by moving in the mounting direction in such a manner that the container-side terminal portion 156 slips into the apparatus-side terminal section 141 arranged on the inclined surface 143 while being in contact therewith. Even when adhered substances such as dust adheres to the container-side terminal portion 156 or the apparatus-side terminal section 141 with the container-side terminal portion 156 slipping into the apparatus-side terminal section 141 on the inclined surface 143 while being in contact therewith, electrical junction is secured by pushing away such adhered substances.

When the container-side terminal portion 156 comes into contact with the apparatus-side terminal section 141, the guide protrusions 144L and 144R of the terminal holder 142 engage with the guide recesses 162L and 162R of the waste liquid container 150, respectively. Thus, the container-side terminal portion 156 is accurately positioned with respect to the apparatus-side terminal section 141. When the container-side terminal portion 156 is electrically coupled to the apparatus-side terminal section 141, the controller 1100 can write and read an expected cumulative discharge amount to and from the memory of the container-side terminal portion 156 every time the suction cleaning is performed.

Whether or not the waste liquid container 150 is properly mounted can be determined by the controller 1100 detecting the electrical coupling between the container-side terminal portion 156 and the apparatus-side terminal section 141. However, when the container-side terminal portion 156 and the apparatus-side terminal section 141 have a predetermined area in plan view and both come into contact with each other while facing each other in an inclined so as to intersect in the mounting direction, the controller 1100 detects the coupling therebetween even when the discharge unit 131 is not sufficiently inserted into the coupling opening 161*a* as long as the both are partially in contact with each other.

Figure 28:
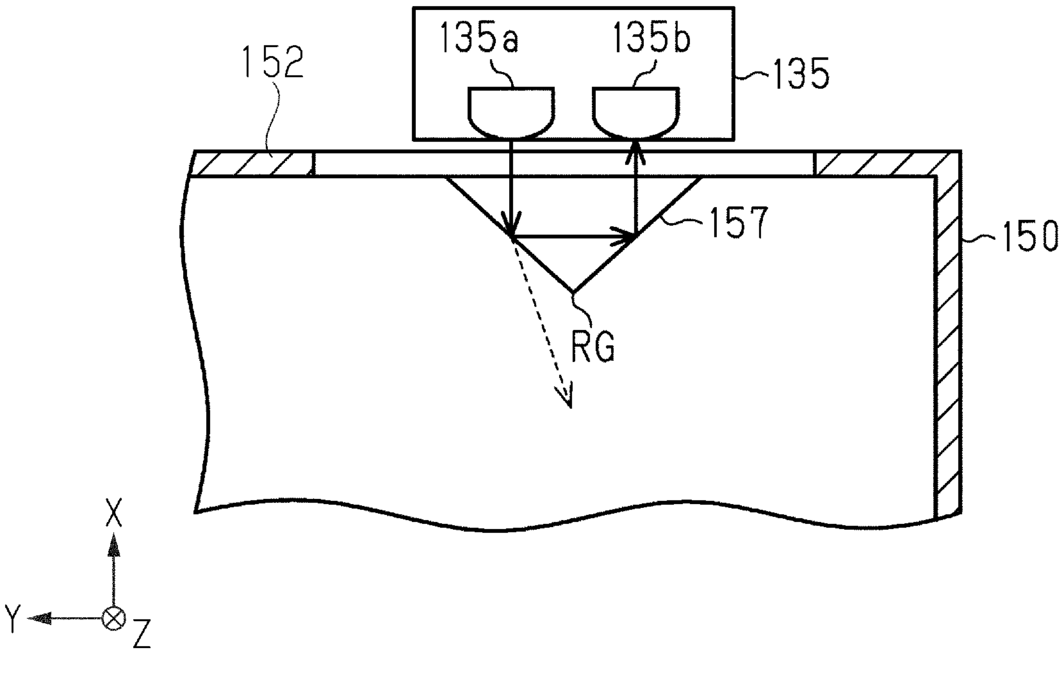
FIG. 28 is a schematic view illustrating the operation of a reflective section included in the waste liquid container of FIG. 12.

As illustrated in FIG. 28, it is preferable that the reflector 157 has a triangular prism (critical angle prism) whose light reflection state changes depending on the presence or absence of waste liquid in the storage chamber 170, specifically, the detection chamber 175. In this case, the reflector 157 is arranged so that two surfaces of the triangular prism protrude into the detection chamber 175 formed in the waste liquid container 150 and the remaining one surface is exposed to the outside of the waste liquid container 150.

Then, when the light emitted by the light emitting section 135*a* of the optical sensor 135 enters the triangular prism from the surface exposed to the outside of the waste liquid container 150, the incident light is reflected on the other two surfaces, and the reflected light is received by the light receiving section 135*b*, as indicated by the solid arrows in FIG. 28, when there is no waste liquid in a region in contact with the triangular prism in the detection chamber 175. On the other hand, when the region in contact with the triangular prism in the detection chamber 175 is filled with the waste liquid, the incident light passes through the triangular prism without being reflected, as indicated by the broken line in FIG. 28, and thus the light receiving section 135*b* does not receive the reflected light.

As described above, when the amount of the reflected light received by the light receiving section 135*b* of the optical sensor 135 is reduced as the waste liquid flows into the detection chamber 175, it is detected that the remaining capacity of the waste liquid container 150 to store the waste liquid is used up or reduced. When such insufficient remaining capacity is detected as described above, the controller 1100 detects, based on a detection signal from the optical sensor 135, the full state of the waste liquid container 150 or the insufficient remaining capacity.

Assuming that the space into which the waste liquid first flows is the detection chamber 175, it takes time to perform detection because it is required to wait for the waste liquid to be absorbed by the waste liquid absorber 171 for detection. On the other hand, in this embodiment, the waste liquid that has flowed into the waste liquid container 150 flows through the guide channel to be absorbed by the waste liquid absorber 171 and then the overflowing waste liquid flows into the detection chamber 175. Thus, it is not required to wait for the insufficient remaining capacity to be detected until the waste liquid flowing into the detection chamber 175 is absorbed by the waste liquid absorber 171. Thus, the full state or the insufficient remaining capacity can be quickly detected.

When the controller 1100 detects the full stat or insufficient remaining capacity of the waste liquid container 150, the controller 1100 can encourage the user to replace the waste liquid container 150 by displaying an error on the operation unit 129 (see FIG. 10) including a liquid crystal panel or the like. It is possible to detect that there is no more remaining capacity, that is, the full state by arranging the reflector 157 closer to above the detection chamber 175 and to detect that the remaining capacity is reduced, that is, insufficient remaining capacity by arranging the reflector 157 closer to below the detection chamber 175.

Figure 29:
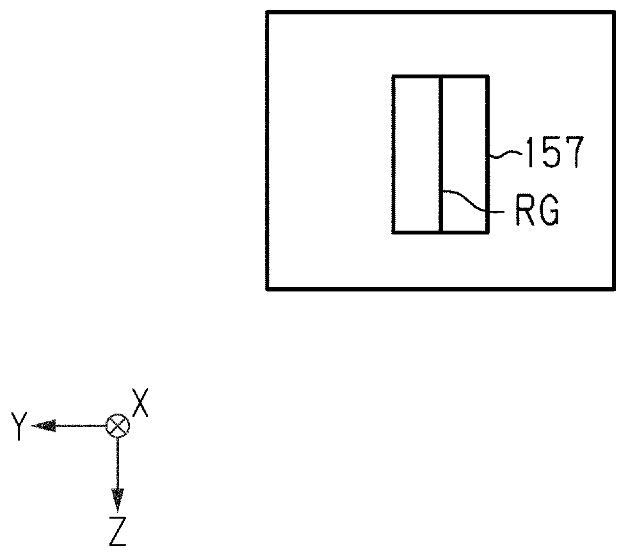
FIG. 29 is a side view of the reflective section of FIG. 28 as seen from the inside of the waste liquid container.

As illustrated in FIG. 29, when the reflector 157 is a triangular prism, it is preferable that the prism is arranged so that a ridge line RG formed by intersecting the two surfaces of the triangular prism facing the detection chamber 175 extends in the vertical direction. When some kind of impact is applied to the waste liquid container 150 in a state where a small amount of waste liquid is contained in the detection chamber 175, the waste liquid in the detection chamber 175 may adhere to the triangular prism. In such a case, when the prism is arranged so that the ridge line RG formed by intersecting the two surfaces of the triangular prism extends in the vertical direction, the waste liquid in the detection chamber 175 quickly flows down even if the waste liquid temporarily adheres to the triangular prism as compared with the case where the ridge line RG extends horizontally. Therefore, it is possible to avoid erroneous detection of the remaining capacity due to the adhesion of the waste liquid.

As described above, according to the above embodiment, advantageous effects as described above can be achieved.

(1) When the waste liquid container 150 is seen along the mounting direction, the coupling opening 161*a* is arranged at a position shifted to the −Y side instead of the center in the width direction, and the container-side terminal portion 156 and the reflector 157 are arranged on the +Y side. Therefore, even when the waste liquid drips in the gravity direction from the coupling opening 161*a*, it is possible to prevent the waste liquid from adhering to the container-side terminal portion 156 and the reflector 157.

(2) Since the reflector 157 is arranged so as to face the mounting direction, the optical sensor 135 can be arranged next to the apparatus-side terminal section 141 in the mounting portion 130. Thus, it is possible to prevent the mounting portion 130 from increasing in size in the direction along the Y-axis.

(3) The container-side terminal portion 156 is provided at a position aligned with the coupling opening 161*a* in the width direction. That is, since the heights of the container-side terminal portion 156 and the coupling opening 161*a* are substantially the same, it is possible to prevent the waste liquid dripping from the coupling opening 161*a* from adhering to the container-side terminal portion 156.

(4) Since the recess 158 and the positioning recess 134L are arranged between the coupling opening 161*a* and the reflector 157 in the width direction, the waste liquid dripping from the coupling opening 161*a* is less likely to reach the reflector 157, making it possible to suppress the adhesion of the waste liquid to the reflector 157.

(5) Since the container-side terminal portion 156 is provided on the takeout direction side of the coupling opening 161*a* and on the upward slope, the waste liquid dripping from the coupling opening 161*a* can be further prevented from adhering to the container-side terminal portion 156.

(6) Since the reflector 157 is provided below the container-side terminal portion 156, it can be said that the reflector is located at the position where the waste liquid dripping from the coupling opening 161*a* can easily enter. However, the reflector 157 is provided on the takeout direction side of the container-side terminal portion 156. Thus, the adhesion of the waste liquid to the reflector 157 can be suppressed.

(7) Since the reflector 157 has a prism whose light reflection state changes depending on the presence or absence of the waste liquid, it is possible to accurately detect whether or not the waste liquid container 150 is filled with the waste liquid.

(8) Since the detection chamber 175 is separated from the waste liquid storage chamber 173 by the partition plate 172T and the protective absorber 174, even when a large amount of waste liquid flows vigorously into the waste liquid container 150, the waste liquid can be suppressed from flowing into the detection chamber 175. Even when the waste liquid container 150 is tilted, the partition plate 172T and the protective absorber 174 make it possible to suppress the waste liquid from flowing into the detection chamber 175.

(9) Since the detection chamber 175 is provided not immediately below the insertion tube 165 but at a position shifted to the +Y side from the waste liquid storage chamber 173A in which the insertion tube 165 is arranged, there is no longer a risk that the waste liquid discharged from the insertion tube 165 flows into the detection chamber 175 through the outer surface of the insertion tube 165 even if the waste liquid container 150 is rotated around the Y-axis and the waste liquid storage chamber 173A becomes lower than the waste liquid storage chamber 173C.

(10) In the storage case 152, the communicating space 176 for communicating the detection chamber 175 and the waste liquid storage chamber 173 is located closer to the base end than to the tip of the insertion tube 165 that discharges the waste liquid into the waste liquid storage chamber 173. Therefore, it is possible to prevent the waste liquid discharged from the insertion tube 165 from adhering directly to the protective absorber 174 arranged in the communicating space 176 and flowing into the detection chamber 175.

The above embodiments may be changed as in the modifications described below. The above embodiments and each modification can be realized in combination as appropriate.

Figure 30:
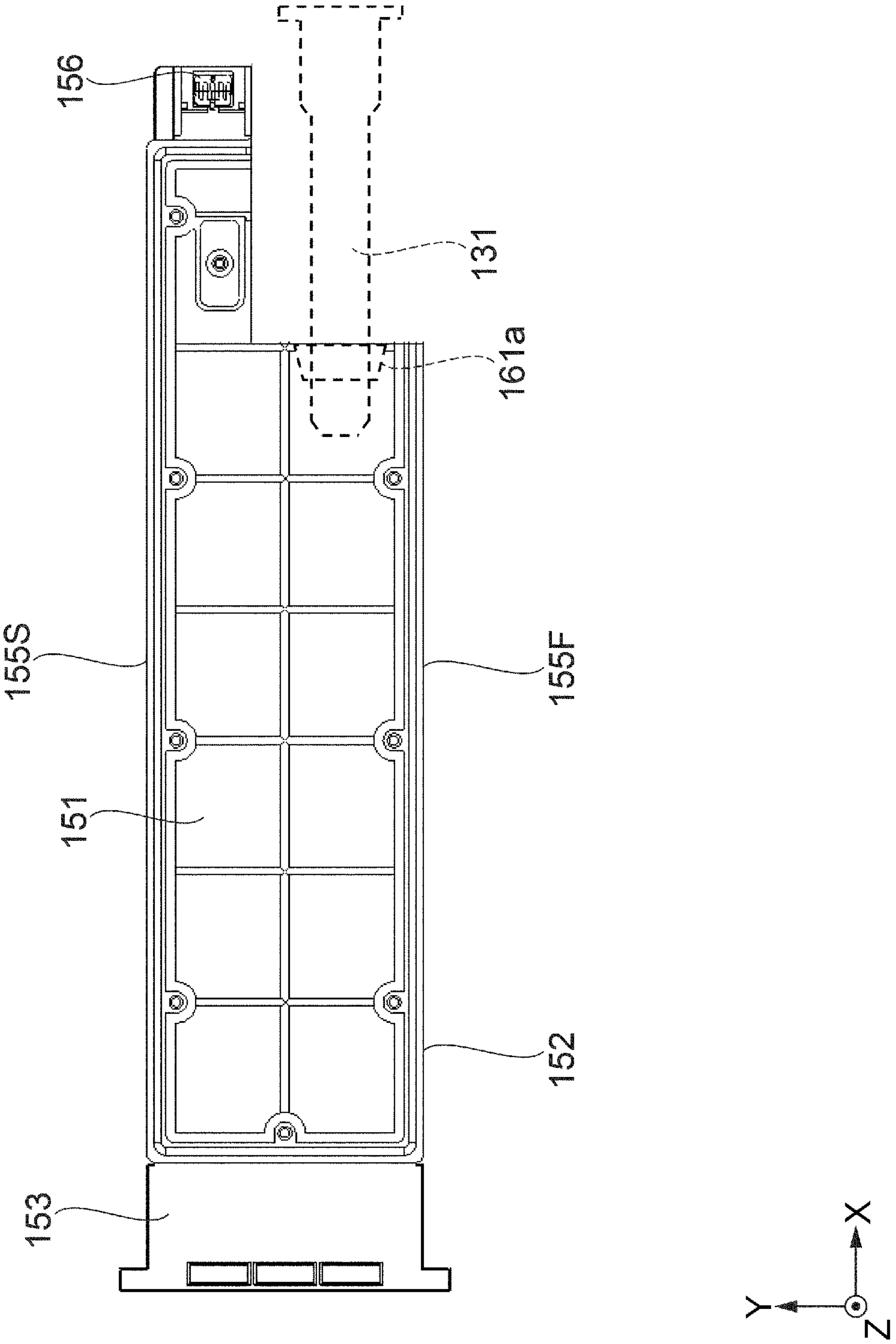
FIG. 30 is a top view illustrating a waste liquid container of a modification.

As illustrated in FIG. 30, the coupling opening 161*a* of the waste liquid container 150 may be arranged on the −X side, which is the front side in the mounting direction with respect to the +X side end, which is the back side in the mounting direction.

The direction of inclination of the container-side terminal portion 156 and the apparatus-side terminal section 141 may be opposite to that of the above embodiment. That is, the apparatus-side terminal section 141 may be arranged below the container-side terminal portion 156 in the state where the waste liquid container 150 is mounted on the mounting portion 130. The direction of inclination of the container-side terminal portion 156 and the apparatus-side terminal section 141 may be perpendicular to the X direction, perpendicular to the Y direction, or perpendicular to the Z direction.

The coupling opening 161*a* may be arranged on the +Y side in the width direction of the waste liquid container 150. In this case, the container-side terminal portion 156 and the reflector 157 are arranged on the −Y side.

At least one of the container-side terminal portion 156 and the reflector 157 may be arranged on the case side walls 155F and 155S as long as it is located on the opposite side of the coupling opening 161*a*. For example, when the coupling opening 161*a* is arranged on the −Y side as in the above embodiment, at least one of the container-side terminal portion 156 and the reflector 157 may be arranged on the case side wall 155S on the +Y side.

Regardless of the amount of waste liquid contained in the waste liquid container 150, when the waste liquid container 150 is mounted at an appropriate position, the reflector 157 may reflect the emitted light toward the light receiving section 135*b*. In this case, the reflector 157 includes a mirror, for example, and when the waste liquid container 150 is mounted on the mounting portion 130, the optical sensor 135 receives the light reflected by the reflector 157. On the other hand, when the waste liquid container 150 is not mounted on the mounting portion 130, the optical sensor 135 receives no light. Thus, the optical sensor 135 can detect the mounting state of the waste liquid container 150.

When the waste liquid unexpectedly flows into the detection chamber 175 beyond the upper end of the partition plate 172T from the waste liquid storage chamber 173, the waste liquid absorbers 171 may be arranged between the upper end of the partition plate 172T and the reflector 157 in the detection chamber 175 so that the waste liquid does not affect the detection result from the optical sensor 135.

It is not necessary to provide any guide channel formed by the notches 171*r* of the waste liquid absorbers 171 and the space SP inside the waste liquid storage chamber 173.

The waste liquid container 150 does not have to include the waste liquid absorber 171 and the protective absorber 174. In this case, the communicating space 176 is not provided between the waste liquid storage chamber 173 and the detection chamber 175, and when the waste liquid in the waste liquid storage chamber 173 flows beyond the height of the partition plate 172T, the waste liquid flows into the detection chamber 175.

When the waste liquid introduced into the waste liquid container 150 has reduced fluidity due to increase in viscosity caused by evaporation or the like and is likely to clog the guide channel, a flow channel may be provided to communicate the guide channel and the detection chamber 175. On the other hand, when the fluidity is less likely to be reduced by the increase in viscosity of the waste liquid, it is preferable that the detection chamber 175 is a space independent of the guide channel, that is, a space not directly communicated with the guide channel, as in the above embodiment.

The waste liquid container 150 may function as an attachment that is coupled to a waste liquid tank arranged on the outside of the main body of the liquid ejecting apparatus 111 through a tube or the like, and is attached to the liquid ejecting apparatus 111 to discharge the waste liquid generated in the liquid ejecting apparatus 111 to the waste liquid tank. In this case, by arranging the waste liquid tank below the discharge unit 131 in the gravity direction, the waste liquid can flow down naturally.

Alternatively, a container coupling section may be provided on the front side, that is, on the −X side in the mounting direction of the waste liquid container 150, and a waste liquid tank arranged outside the main body of the liquid ejecting apparatus 111 may be detachably coupled to this container coupling section. As described above, when the waste liquid container 150 is used as the attachment, the waste liquid container 150 does not have to be replaced. Therefore, the waste liquid container 150 may be fixed without being removed from the liquid ejecting apparatus 111.

The liquid ejecting apparatus 111 is not limited to the one having a line head whose recording range covers the entire width of the medium S. For example, the liquid ejecting apparatus 111 may be of a serial type in which liquid ejection performed by a carriage holding the liquid ejecting unit 113 while moving in the ±X direction along the guide shaft and the transport of the medium S in the +Y direction are alternately performed.

The liquid ejected by the liquid ejecting unit 113 is not limited to ink, and may be a liquid in which particles of a functional material are dispersed or mixed in a liquid, for example. For example, the liquid ejecting apparatus 111 may be configured to perform recording by ejecting a liquid containing a material such as an electrode material or a coloring material (pixel material) used in the manufacture of a liquid crystal display, an electroluminescence (EL) display, and a surface-emitting display, or the like in the form of dispersion or dissolution.

The medium S is not limited to paper, but may be a plastic film, a thin plate, or the like, or may be a cloth used for a printing apparatus or the like. The medium S is not limited to a sheet shape or a plate shape, but may be a garment such as a T-shirt or a three-dimensional object such as tableware or stationery.

The waste liquid container 150 may contain a waste liquid obtained by collecting a mist scattered during the ejection of the liquid or the like, or may contain not only the liquid used to be ejected onto the target but also various functional liquids such as a cleaning liquid used for cleaning of the liquid ejecting unit or the like. Alternatively, the waste liquid container 150 may be one that contains an arbitrary waste liquid such as a used test liquid or a reagent used for inspection or the like, for example, in an apparatus other than the liquid ejecting apparatus.

The apparatus in which the waste liquid container 150 is mounted is not limited to the liquid ejecting apparatus that ejects the liquid, but may be a cleaning apparatus that consumes a cleaning liquid for cleaning of a target and discharges the used cleaning liquid as a waste liquid, a liquid circulation apparatus that discharges some of a circulating liquid, which has been circulated for a predetermined number of times, as a waste liquid for replacement or the like.

What is claimed is:

1. A supply unit in which a liquid container including a coupling portion having elasticity is detachably mounted, comprising:

a liquid introduction unit coupled to the coupling portion of the liquid container;

an urging member that urges the liquid container in an uncoupling direction which is a direction opposite to a coupling direction, the coupling direction being a direction in which the liquid container is coupled to the liquid introduction unit; and an engagement lever having an engaging portion that engages with the liquid container when the liquid container is coupled to the liquid introduction unit, wherein the engagement lever includes an operating portion configured to be displaced by an operation of a user and a pressing portion configured to press the liquid container, and due to a displacement of the operating portion from a stopping position to an operation position, the engagement lever is configured to release engagement of the engaging portion with the liquid container and to press the liquid container in the uncoupling direction by the pressing portion.

2. The supply unit according to claim 1, wherein the engaging portion, the operating portion, and the pressing portion are configured to rotate about a first rotation shaft, and a distance from the first rotation shaft to the operating portion is longer than a distance from the first rotation shaft to the pressing portion.

3. The supply unit according to claim 1, wherein a distance of movement in the uncoupling direction of the liquid container pressed by the pressing portion is shorter than a distance of movement in the uncoupling direction of the liquid container urged by the urging member.

4. The supply unit according to claim 1, further comprising a mounting section in which the liquid container is to be mounted, wherein an insertion opening for inserting the liquid container is formed in the mounting section, and the engagement lever is arranged so that the operating portion is located outside the insertion opening.

5. The supply unit according to claim 1, further comprising a support member that supports the liquid container, wherein the urging member urges the liquid container through the support member, and the pressing portion presses the liquid container through the support member.

6. The supply unit according to claim 5, wherein the support member is configured to rotate about a second rotation shaft, which intersects the coupling direction, between a first position and a second position that is located in the coupling direction relative to the first position, the liquid container is guided to a predetermined position on the support member along a guide path, which intersects both the coupling direction and the second rotation shaft, in a state where the support member is located at the first position, and the liquid introduction unit is coupled to the liquid container by the support member rotating, in a state where the liquid container is located at the predetermined position, from the first position to the second position.

7. The supply unit according to claim 6, wherein the liquid introduction unit is arranged in an inclined posture with respect to the guide path.

8. A liquid discharging apparatus comprising:

the supply unit according to claim 1; and a liquid discharging head that discharges a liquid supplied from the supply unit to a medium.

* * * * *